United States Patent
Willems et al.

(10) Patent No.: US 8,588,320 B2
(45) Date of Patent: Nov. 19, 2013

(54) SCALED AND ROTATED ALAMOUTI CODING

(75) Inventors: Franciscus M. J. Willems, Eindhoven (NL); Semih Serbetli, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1097 days.

(21) Appl. No.: 12/527,436

(22) PCT Filed: Feb. 20, 2008

(86) PCT No.: PCT/IB2008/050601
§ 371 (c)(1),
(2), (4) Date: Aug. 17, 2009

(87) PCT Pub. No.: WO2008/102305
PCT Pub. Date: Aug. 28, 2008

(65) Prior Publication Data
US 2010/0020896 A1    Jan. 28, 2010

(30) Foreign Application Priority Data
Feb. 21, 2007   (EP) .................................... 07102772

(51) Int. Cl.
*H04B 7/02*   (2006.01)
(52) U.S. Cl.
USPC ........................................................ 375/267
(58) Field of Classification Search
USPC ......... 375/259, 260, 267, 285, 295, 299, 316, 375/340, 341, 346, 347, 349; 455/91, 101, 455/103, 114.2
See application file for complete search history.

(56) References Cited

U.S. PATENT DOCUMENTS

2004/0018855 A1 * 1/2004 Wallace et al. ............... 455/561

FOREIGN PATENT DOCUMENTS

WO    9914871 A1    3/1999

OTHER PUBLICATIONS

Das et al. "Novel Full-Diversity High-Rate STBC for 2 and 4 Transmit Antennas", IEEE Communications Letters, vol. 10, Issue 3, Mar. 2006, pp. 171-173.*
Althaus et al: "Path-Diversity for Phase Detection in Low-Cost Sensor Networks"; 4th IEEE Workshop on Signal Processing Advnaces in Wireless Communication, Rome, Italy, Jun. 2003, pp. 175-179.
Ling et al: "Efficiency Improvement for Alamouti Codes"; 40th Annual Conference on Information Sciences and Systems, Mar. 2006, pp. 569-572.
Li et al: "Alamouti Transmit Diversity Scheme With a Simple Diagonal Weighting Matrix"; 2005 IEEE International Symposium on Microwave, Antenna, Propagation and EMC Technologies for Wireless Communications Proceedings, 2005, pp. 1373-1377.
Willems: "Rotated and Scaled Alamouti Coding"; IEEE International Symposium on Information Theory, ISIT 2008, pp. 1288-1292.
Alamouti: "A Simple Transmit Diversity Technique for Wireless Communications"; IEEE Journal on Select Areas in Communications, vol. 16, No. 8, Oct. 1998, pp. 1451-1458.

(Continued)

*Primary Examiner* — Sam K Ahn
*Assistant Examiner* — Vineeta Panwalkar

(57) ABSTRACT

The present invention relates to an encoder for encoding incoming symbols of an incoming data stream into channel symbols of a channel data stream for transmission over a transmission channel as well as to a corresponding decoder. To improve the error rate compared to a known Alamouti encoder, a scaled Alamouti encoder is proposed. In an alternative embodiment a scaled and rotated Alamouti encoder is proposed.

14 Claims, 13 Drawing Sheets

(56) References Cited

OTHER PUBLICATIONS

Belfiore et al: "The Golden Code: A 2×2 Full-Rate Space-Time Code With Nonvanishing Determinants"; IEEE Transactions on Information Theory, vol. 51, No. 4, Apr. 2005, pp. 1432-1436.

Benelli: "A New Method for the Integration of Modulation and Channel Coding in an ARQ Protocol"; IEEE Transactions on Communications, vol. 40, No. 10, Oct. 1992, pp. 1594-1606.

Tarokh et al: "Space-Time Codes for High Data Rate Wireless Communication: Performance Criterion and Code Construction"; IEEE Transactions on Information Theory, vol. 44, No. 2, Mar. 1998, pp. 744-765.

Telatar: "Capacity of Multi-Antenna Gaussian Channels"; European Transactions on Telecommunications, vol. 10, No. 6, pp. 585-595, Nov.-Dec. 1999.

Yao: "Efficient Signal, Code, and Receiver Designs for Mimo Communicaiton Systems"; Ph.D Thesis, Submitted to the Dept. of Electrical Engineering and Computer Science, Massachusetts Institute of Technology, Jun. 2003, 205 Page Document.

Yao et al: "Achieving the Full Mimo Diversity-Multiplexing Frontier With Rotation-Based Space-Time Codes"; Proceedings of the Allerton Communication Control, and Computing, Monticello, IL, Oct. 2003, 10 Page Document.

Rizvi et al: "Combined Multiple Multiple Transmit Antennas and Multilevel Modulation Techniques"; Proceeding of the 28th Symposium on Information Theory in the Benelux, Enschede, The Netherlands, May 24-25, 2007, 8 Page Document.

Wengerter et al: "Constellation Rearrangement: Enhancement for Multilevel Modulation Formats and Transmit Diversity";, Wireless Personal Communications (2004), vol. 29 (1-2), pp. 35-45.

Slimane: "Combined Transmitter Diversity and Multi-Level Modulation Techniques": Wireless Personal Communications (2006), vol. 39(2), pp. 215-227.

\* cited by examiner

US 8,588,320 B2

SCALED AND ROTATED ALAMOUTI CODING

FIELD OF THE INVENTION

The present invention relates to an encoder and a corresponding encoding method for encoding incoming symbols of an incoming data stream into channel symbols of a channel data stream for transmission over a transmission channel.

Further, the present invention relates to a decoder and a corresponding decoding method being adapted for block by block decoding received channel symbols of a channel data stream, which have been encoded from incoming symbols of an incoming data stream, in particular by an encoder according to the present invention, and transmitted over a transmission channel.

The present invention relates also to a transmitter and a receiver, to a data signal encoded by an encoder according to the present invention and a computer program for implementing the encoding method and the decoding method in software.

BACKGROUND OF THE INVENTION

WO 99/14871 discloses a simple block coding arrangement in which symbols are transmitted over a plurality of transmit channels, in connection with coding that comprises only of simple arithmetic operations, such as negation and conjugation. The diversity created by the transmitter utilizes space diversity and either time or frequency diversity. Space diversity is effected by redundantly transmitting over a plurality of antennas, time diversity is effected by redundantly transmitting at different times, and frequency diversity is effected by redundantly transmitting at different frequencies. Illustratively, using two transmit antennas and a single receive antenna, one of the disclosed embodiments provides the same diversity gain as the maximal-ratio receiver combining (MRRC) scheme with one transmit antenna and two receive antennas.

The coding scheme disclosed in WO 99/14871 is known in the art as Alamouti coding scheme and has also been described in S. M. Alamouti "A simple transmit diversity technique for wireless communications", IEEE J. Sel. Areas. Comm. vol. 16, pp. 1451-1458, October 1998.

SUMMARY OF THE INVENTION

It is an object of the present invention to provide a coding scheme, in particular an encoder and a decoder as well as corresponding methods, having a better performance than the known Alamouti coding scheme.

The object is achieved according to the present invention by an encoder as claimed in claim 1, comprising:

mapping means for block by block mapping incoming symbols onto pairs of channel symbols, a block comprising two incoming symbols, the mapping means being arranged for mapping the block onto two pairs of channel symbols such that said two pairs of channel symbols include scaled versions of said two incoming symbols and/or of the complex conjugate of at least one of said two incoming symbols, said scaled versions being obtained by applying a scaling function having having a scaling factor with an absolute value different from one and being piece-wise linear with at least two pieces, and output means for outputting said channel symbols.

According to a variant of the invention, the mapping means are adapted for applying a scaling function for scaling said incoming symbols, said scaling function being dependent on the sign of one of the two incoming symbols, in particular of the second incoming symbol.

In another variant of the invention the mapping means are adapted for applying a scaling function for scaling said incoming symbols, said scaling function being dependent on the constellation of the two incoming symbols.

In still another variant of the invention, the mapping means are adapted for applying a scaling function $M(s)$ for scaling said incoming symbols s, said scaling function M being chosen such that $M(M(s))=-s$.

In still another variant of the invention, the mapping means are adapted for applying a scaling function $M_2(s)$ for scaling said incoming symbols s, said scaling function $M_2(s)$ being chosen as $M_2(s)=2s-D_2(s)$, wherein $D(s)=5b$ and b is the complex sign of s, defined as $b=\text{sign}(\text{Re}(s))+j\text{sign}(\text{Im}(s))$.

In another variant of the invention, the mapping means are adapted for applying a scaling function $M_3(s)$ for scaling said incoming symbols s, said scaling function $M_3(s)$ being chosen as $M_3(s)=3s+D_3(s)$, wherein the sub-function $D_3(s)=X$ for large positive values of s, $D_3(s)=-X$ for large negative values of s and $D_3(s)=0$ for small positive or negative values of s and for $s=0$, X being an integer constant.

In another variant of the invention, the output means are adapted for outputting said channel symbols to two transmission means, in particular two transmission antennas, for transmitting said channel symbols over said transmission channel.

The object is further achieved according to the present invention by a decoder as claimed in claim 9.

A preferred embodiment of the decoder comprises:

selection means for selecting a pair of possible function values of incoming symbols or of possible function values of a scaled version of incoming symbols for decoding a current block of received channel symbols, wherein a block comprises a pair of received channel symbols, estimation means for determining an estimate of the selected pair of incoming symbols, calculating means for calculating the Euclidian distance between the received signal and said estimate, slicing means for slicing said estimate, and control means for repeating said steps with other pairs of possible function values of possible incoming symbols or of possible function values of a scaled version of incoming symbols until a predetermined stop condition is met or until a minimum Euclidian distance is found and for outputting said pair of sliced estimate of possible incoming symbols or of sliced estimate of said scaled version of possible incoming symbols resulting in the minimum Euclidian distance.

In a variant of this aspect of the invention, the subtraction means are adapted for applying as sub-function $D_2$ the function $D_2(s)=5b$, wherein b is the complex sign of s.

In another variant of this aspect, the decoder further comprises decision means for deciding whether to decode a block of received channel symbols comprising two received channel symbols or a block of scaled versions of received channels symbols comprising two received channel symbols, which have been scaled by applying said scaling function, said decision being made based on channel estimates of the absolute values of the channel transfer functions of said transmission channel.

In still another aspect of the invention, the decision means are adapted for deciding to decode a block of received channel symbols comprising two received channel symbols if the condition $|h_{12}|^2+|h_{22}|^2 \geq |h_{11}|^2+|h_{21}|^2$ is met and to decode a block of scaled versions of received channels symbols comprising two received channel symbols, which have been scaled by applying said scaling function, if said condition is not met, where said parameters $h_{12}$, $h_{22}$, $h_{11}$, $h_{21}$ are the estimates of the channel transfer functions of said transmission channel.

The invention also relates to an encoding method, a decoding method, a transmitter, a receiver, an encoded data signal and a computer program as defined in further independent claims. It shall be understood that these subject matters have similar and/or identical preferred embodiments as defined in the dependent claims of the encoder and decoder, respectively.

In particular, in addition to scaling incoming symbols and/or the complex conjugate of incoming symbols, it is preferred according to the present invention, in order to further improve the performance, that (the same and/or other) incoming symbols and/or the complex conjugate of (the same and/or other) incoming symbols are rotated by a rotation angle as defined in claim 7. Correspondingly, the encoding method, the decoder, the decoding method and the encoded signal are adapted accordingly according to preferred embodiments of the present invention.

BRIEF DESCRIPTION OF THE DRAWINGS

The invention will now be explained in more detail with reference to the drawings in which.

DETAILED DESCRIPTION OF EMBODIMENTS

Figure 1:
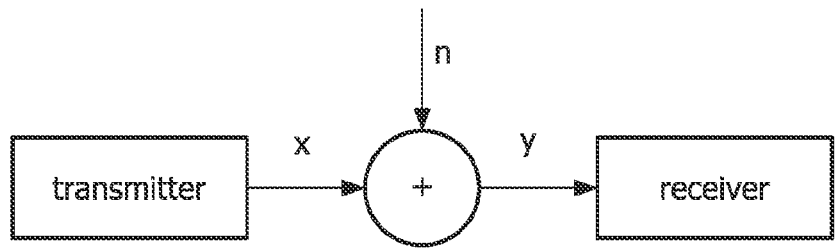
FIG. 1 shows a block diagram of a general channel on which noise is added to a transmitted signal.

First transmission over a single-input single-output (SISO) additive white Gaussian noise (AWGN) channel as shown in FIG. 1 shall be considered, and scaled-repetition retransmission shall be introduced. It turns out that scaled-repetition improves upon ordinary-repetition retransmission.

First, some information theory shall be discussed. The real-valued output $y_k$ for transmission k=1, 2, ..., K, see FIG. 1, satisfies $$y_k = x_k + n_k, \quad (1)$$

where $x_k$ is the real-valued channel input for transmission k and $n_k$ is a real-valued Gaussian noise sample with mean $E[N_k]=0$, variance $E[N_k^2]=\sigma_2$, which is uncorrelated with all other noise samples. The transmitter power is limited, i.e. it is required that $E[X_k^2] \leq P$. It is well-known that an X which is Gaussian with mean 0 and variance P achieves capacity. This basic capacity (in bit/transm.) equals $$C = \frac{1}{2}\log_2\left(1 + \frac{P}{\sigma^2}\right). \quad (2)$$

When codewords are retransmitted (repeated), each symbol $x_k$ from such a codeword $(x_1, x_2, \ldots, x_K)$ is actually transmitted and received twice, i.e. $x_{k1}=x_{k2}=x_k$, and $$y_{k1} = x_k + n_{k1}, \quad (3)$$

$$y_{k2} = x_k + n_{k2}.$$

An optimal receiver can form $$z_k = \frac{y_{k1} + y_{k2}}{2} = x_k + \frac{n_{k1} + n_{k2}}{2}. \quad (4)$$

Now the variance of the noise variable $(N_{k1}+N_{k2})/2$ is $\sigma^2/2$. Therefore the repetition capacity for a single repetition in bit/transm. is $$C_r = \frac{1}{4}\log_2\left(1 + \frac{2P}{\sigma^2}\right). \quad (5)$$

Figure 3:
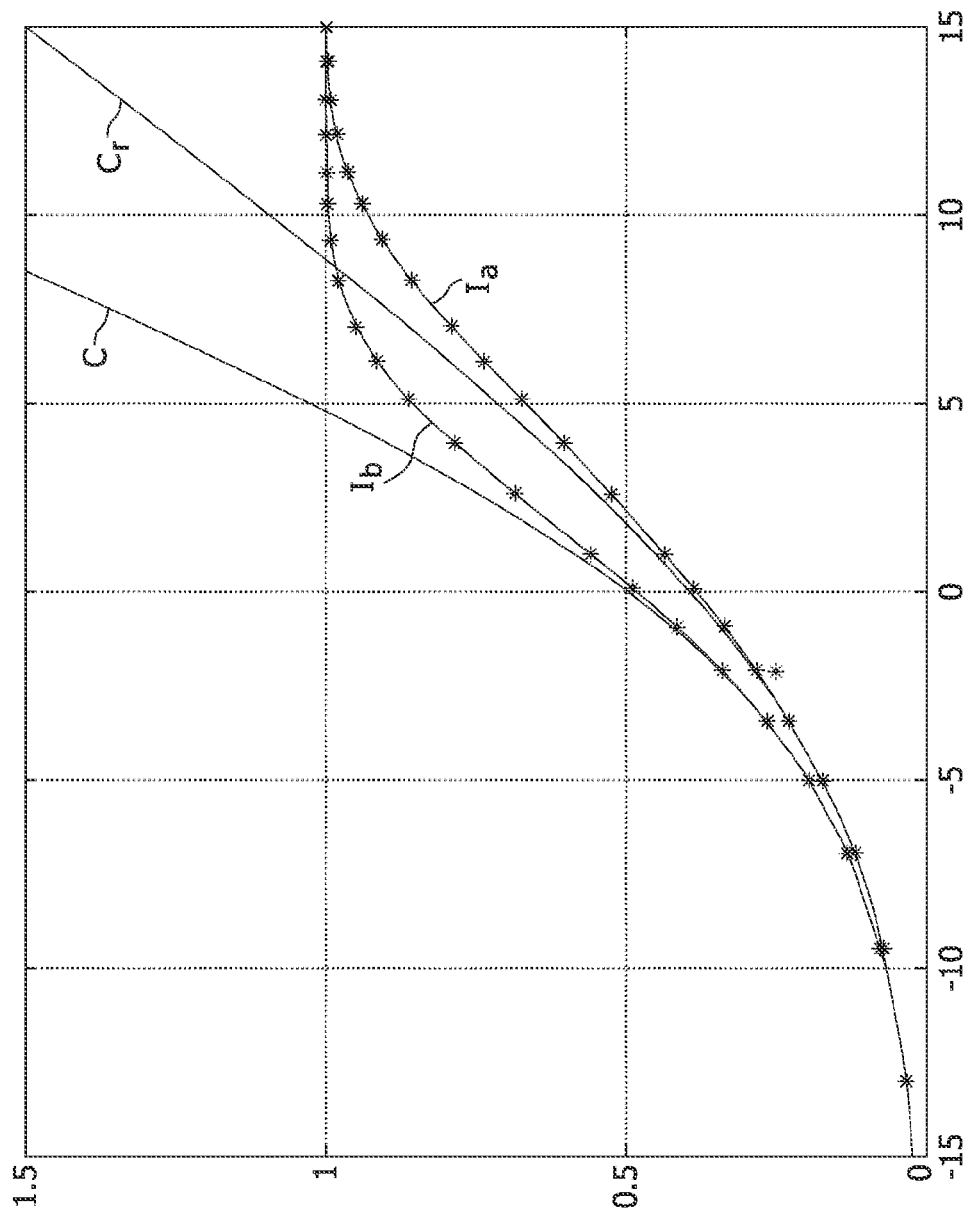
FIG. 3 shows a diagram illustrating the basic capacity C, the repetition capacity $C_r$, the maximum transmission rates achievable with 4-PAM in the ordinary-repetition case Ia and the maximum rates achievable using scaled-repetition mapping Ib.

FIG. 3 shows the basic capacity C and repetition capacity $C_r$ as a function of the signal-to-noise ratio SNR which is defined as $$SNR \triangleq \frac{P}{\sigma^2}. \quad (6)$$

It is easy to see that always $C_r \leq C$. For large SNR it can be written $C_r \approx C/2+\frac{1}{4}$, while for small SNR it is obtained $C_r \approx C$.

Figure 2:
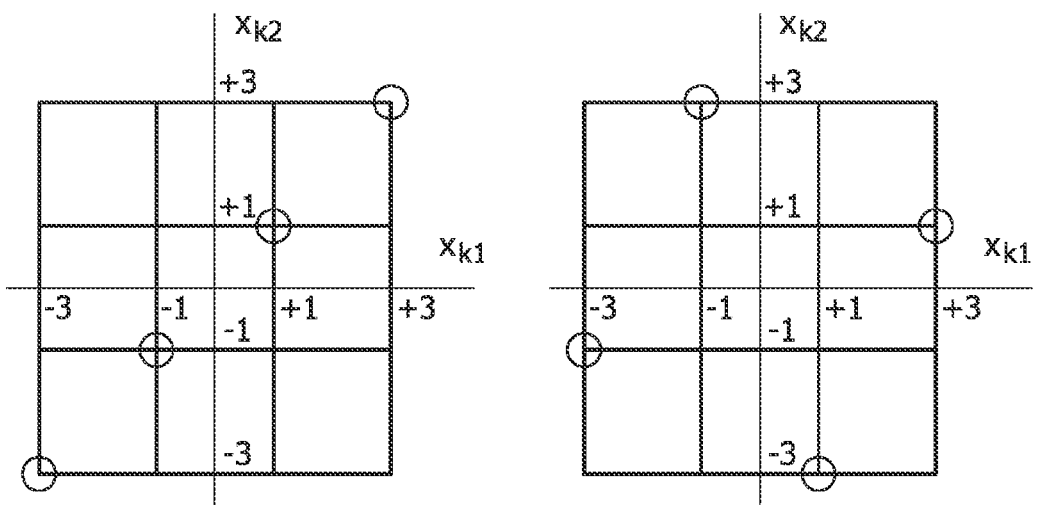
FIG. 2 shows two mappings from $x_{k1}$ to $x_{k2}$, showing on the right the scaled-repetition mapping, on the left the ordinary-repetition mapping.

Next, ordinary and scaled repetition for 4-PAM (pulse-amplitude modulation) shall be discussed. When 4-PAM modulation is used, the channel inputs $x_k$ assume values from $A_{4\text{-}PAM}=\{-3, -1, +1, +3\}$, each with probability ¼. Ordinary repetition, see (3), leads to signal points $(x_1, x_2)=(x,x)$ for $x \in A_{4\text{-}PAM}$, see the left part of FIG. 2. For this case the maximum transmission rate $I_a(X; Y_1, Y_2)$ is shown in FIG. 3. Note that this maximum transmission rate is slightly smaller than the corresponding capacities $C_r$, mainly because uniform inputs are used instead of Gaussians.

Benelli's method (G. Benelli, "A new method for the integration of modulation and channel coding in an ARQ protocol," *IEEE Trans. Commun.*, vol. COM-40, pp. 1594-1606, October 1992) can be used to improve upon ordinary-repetition retransmission, i.e. by modulating the retransmitted symbol differently. It could e.g. be taken $$x_{k1} = x_k,$$

$$x_{k2} = M_2(x_k) \text{ for } x_k \in A_{4\text{-}PAM}, \qquad (7)$$

where $M_2(\alpha) = 2\alpha - 5$ if $\alpha > 0$ and $M_2(\alpha) = 2\alpha + 5$ for $\alpha < 0$. This method is called scaled repetition since a symbol is scaled by a factor (2 here) and then compensated (add −5 or +5) in order to obtain a symbol from $A_{4\text{-}PAM}$. This results in the signal points $(x, M_2(x))$ for $x \in A_{4\text{-}PAM}$, see FIG. 2, right part. Also for the scaled-repetition case the maximum transmission rate $I_b(X; Y_1, Y_2)$ is shown in FIG. 3. Note that this maximum transmission rate is only slightly smaller than the basic capacity C. Ordinary repetition is however definitively inferior to the basic transmission if the SNR is not very small.

Next, the demodulation complexity shall be discussed. Scaled repetition outperforms ordinary repetition, but also has a disadvantage. In an ordinary-repetition system the output $y_k = (y_{k1} + y_{k2})/2$ is simply sliced. In a system that uses scaled repetition it can only be sliced after having distinguished between two cases. More precisely note that $$x_{k2} = M_2(x_k) = 2x_k - D_2(x_k), \qquad (8)$$

where $D_2(\alpha) = 5$ if $\alpha > 0$ and $D_2(\alpha) = -5$ if $\alpha < 0$. Now a slicer can be used for $$\begin{aligned} y_{k1} + 2y_{k2} &= x_k + n_{k1} + 2(2x_k - D_2(x_k) + n_{k2}) \\ &= 5x_k - 2D_2(x_k) + n_{k1} + 2n_{k2}. \end{aligned} \qquad (9)$$

Assuming that $x_k \in \{-3, -1\}$ it is obtained that $D_2(x_k) = -5$ and this implies that a threshold shall be put at 0 to distinguish between −3 and −1. Similarly assuming that $x_k \in \{+1, +3\}$ it is obtained $D_2(x_k) = 5$ and it must be sliced $y_{k1} + 2y_{k2}$ again with a threshold at 0. Then the best overall candidate $\hat{x}_k$ is found by minimizing $(y_{k1} - \hat{x}_k)^2 + (y_{k2} - M_2(\hat{x}_k))^2$ over the two candidates.

Figure 4:
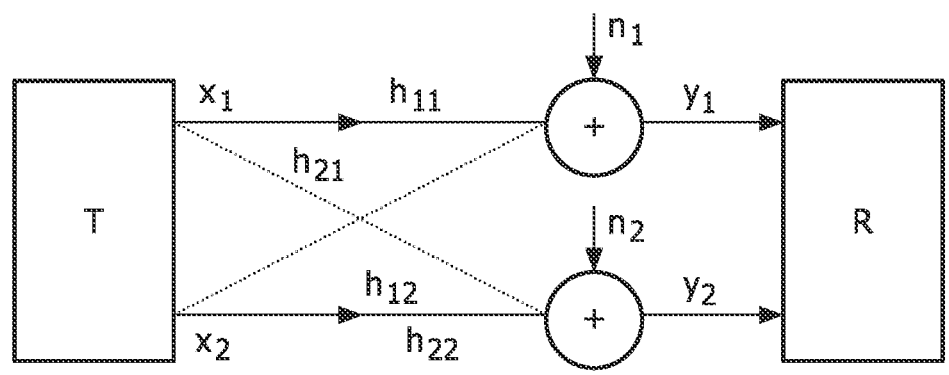
FIG. 4 shows a model of a 2×2 MIMO channel.

Next, fundamental properties for the 2×2 MIMO channel shall be described and a model description shall be introduced. A 2×2 MIMO channel is shown in FIG. 4. Both the transmitter T and the receiver R use two antennas. The output vector $(y_{1k}, y_{2k})$ at transmission k relates to the corresponding input vector $(x_{1k}, x_{2k})$ as given by $$\begin{pmatrix} y_{1k} \\ y_{2k} \end{pmatrix} = \begin{pmatrix} h_{11} & h_{12} \\ h_{21} & h_{22} \end{pmatrix} \begin{pmatrix} x_{1k} \\ x_{2k} \end{pmatrix} + \begin{pmatrix} n_{1k} \\ n_{2k} \end{pmatrix} \qquad (10)$$

where $(n_{1k}, n_{2k})$ is a pair of independent zero-mean circularly symmetric complex Gaussians, both having variance $\sigma^2$ (per two dimensions). Noise variable pairs in different transmissions are independent.

It is assumed that the four channel coefficients $h_{11}$, $h_{12}$, $h_{21}$, and $h_{22}$ are independent zero-mean circularly symmetric complex Gaussians, each having variance 1 (per two dimensions). The channel coefficients are chosen prior to a block of K transmissions and remain constant over that block. The complex transmitted symbols $(x_{k1}, x_{k2})$ must satisfy a power constraint, i.e.

$$E[x_{k1}x^*_{k1} + x_{k1}x^*_{k2}] \leq P. \qquad (11)$$

If the channel input variables are independent zero-mean circularly symmetric complex Gaussians both having variance P/2, then the resulting mutual information (called Telatar capacity here, see I. E. Telatar, "Capacity of multi-antenna Gaussian channels" European Trans. Telecommunications, vol. 10, pp. 585-595, 1999. (Originally published as AT&T Technical Memorandum, 1995)) is $$C_{Telatar}(H) = \log_2 \det\left(I_2 + \frac{P/2}{\sigma^2} HH^\dagger\right), \qquad (12)$$

where $$H = \begin{pmatrix} h_{11} & h_{12} \\ h_{21} & h_{22} \end{pmatrix}, \qquad (13)$$

i.e. the actual channel-coefficient matrix and $I_2$ the 2×2 identity matrix (here $H^\dagger$ denotes the Hermitian transpose of H. It involves both transposition and complex conjugation). Also in the 2×2 MIMO case the signal-to-noise ratio is defined as $$SNR \triangleq \frac{P}{\sigma^2}. \qquad (14)$$

It can be shown (see e.g. H. Yao, "Efficient Signal, Code, and Receiver Designs for MIMO Communication Systems," Ph.D. thesis, M.I.T., June 2003, p. 36) that for fixed R and SNR large enough $$Pr\{C_{Telatar(H)} < R\} \approx \gamma \cdot SNR^{-4}, \qquad (15)$$

for some constant $\gamma$.

The worst-case error-probabilities shall now be described. Consider M (one for each message) K×2 code-matrices $\underline{c}_1$, $\underline{c}_2$, ..., $\underline{c}_M$ resulting in a unit average energy code. Then Tarokh, Seshadri and Calderbank, "Space-Time Codes for High Data Rate Wireless Communication: Performance Criterion and Code Construction," IEEE Trans. Inform. Theory, Vol. 44, pp. 744-765, March 1998, showed that for large SNR $$Pr\{\underline{c} \to \underline{c}'\} \approx \gamma'(det((\underline{c}' - \underline{c})(\underline{c}' - \underline{c})^\dagger))^{-2} SNR^{-4}. \qquad (16)$$

for some $\gamma'$ if the rank of the difference matrices $\underline{c} - \underline{c}'$ is 2, and it is transmitted $x = \sqrt{P}\underline{c}$. If this holds for all difference matrices it is said that the diversity order is 4. Therefore it makes sense to maximize the minimum modulus of the determinant over all code-matrix differences.

S. M. Alamouti, "A simple transmit diversity technique for wireless communications," IEEE J. Sel. Areas. Comm. vol. 16, pp. 1451-1458, October 1998 proposed a modulation scheme (space-time code) for the 2×2 MIMO channel which allows for a very simple detector. Two complex symbols $s_1$ and $s_2$ are transmitted in the first transmission (an odd transmission) and in the second transmission (the next even transmission) these symbols are more or less repeated. More precisely $$\begin{pmatrix} x_{11} & x_{12} \\ x_{21} & x_{22} \end{pmatrix} = \begin{pmatrix} s_1 & -s_2^* \\ s_2 & s_1^* \end{pmatrix}. \qquad (17)$$

The received signal is now $$\begin{pmatrix} y_{11} & y_{12} \\ y_{21} & y_{22} \end{pmatrix} = \begin{pmatrix} h_{11} & h_{12} \\ h_{21} & h_{22} \end{pmatrix} \begin{pmatrix} s_1 & -s_2^* \\ s_2 & s_1^* \end{pmatrix} + \begin{pmatrix} n_{11} & n_{12} \\ n_{21} & n_{22} \end{pmatrix}. \qquad (18)$$

Rewriting this results in $$\begin{pmatrix} y_{11} \\ y_{21} \\ y_{12}^* \\ y_{22}^* \end{pmatrix} = \begin{pmatrix} h_{11} & h_{12} \\ h_{21} & h_{22} \\ h_{12}^* & -h_{11}^* \\ h_{22}^* & -h_{21}^* \end{pmatrix} \begin{pmatrix} s_1 \\ s_2 \end{pmatrix} + \begin{pmatrix} n_{11} \\ n_{21} \\ n_{12}^* \\ n_{22}^* \end{pmatrix}. \quad (19)$$

or more compactly $$\underline{y} = s_1 \underline{a} + s_2 \underline{b} + \underline{n}, \quad (20)$$

with $$\underline{y} = (y_{11}, y_{21}, y^*_{12}, y^*_{22})^T,$$

$$\underline{a} = (h_{11}, h_{21}, h^*_{12}, h^*_{22})^T,$$

$$\underline{b} = (h_{12}, h_{22}, -h^*_{11}, -h^*_{21})^T, \text{ and}$$

$$\underline{n} = (n_{11}, n_{21}, n^*_{12}, n^*_{22})^T. \quad (21)$$

Since a and b are orthogonal the symbol estimates $\hat{s}_1$ and $\hat{s}_2$ can be determined by simply slicing $(\underline{a}^\dagger \underline{y})/(\underline{a}^\dagger \underline{a})$ and $(\underline{y}^\dagger \underline{b})/(\underline{b}^\dagger \underline{b})$ respectively.

Another advantage of the Alamouti method is that the densities of $\underline{a}^\dagger \underline{a}$ and $\underline{b}^\dagger \underline{b}$ are (identical and) chi-square with 8 degrees of freedom. This results in a diversity order 4, i.e.

$$Pr\{(S_1, (\widehat{S_1, S_2}) S_2) \neq (S_1, S_2)\} \approx \gamma^n \cdot SNR^{-4}, \quad (22)$$

for fixed rate and large enough SNR.

A disadvantage of the Alamouti method is that only two complex symbols are transmitted every two transmissions, but more-importantly that the symbols transmitted in the second transmission are more or less repetitions of the symbols in the first transmission. The above however suggests that ordinary repetition can be improved.

The Scaled Alamouti Method

Next, the scaled Alamouti method as proposed according to one embodiment of the present invention shall be described. Having seen above that scaled-repetition improves upon ordinary repetition in the SISO case, this concept can be used to improve upon the standard Alamouti scheme for MIMO transmission.

Instead of just repeating the symbols in the second transmission they are scaled (modulo the size of the signal constellation). More precisely, when $s_1$ and $s_2$ are elements of $$A_{64\text{-}QAM} \triangleq \{a + jb \mid a \in A_{8\text{-}PAM}, b \in A_{8\text{-}PAM}\}, \quad$$

it could be transmitted $$\begin{pmatrix} x_{11} & x_{12} \\ x_{21} & x_{22} \end{pmatrix} = \begin{pmatrix} s_1 & -s_2^* \\ M(3s_2) & M(3s_1^*) \end{pmatrix} \quad (23)$$

$$= \begin{pmatrix} s_1 & -s_2^* \\ 3s_2 & 3s_1^* \end{pmatrix} - \begin{pmatrix} 0 & 0 \\ D(3s_2) & D(3s_1^*) \end{pmatrix}.$$

where $M(\alpha) = \beta$ and $D(\alpha) = 16\gamma$ if $\beta \in A_{64\text{-}QAM}$ and there exists a complex number $\gamma$ with integer components such that $\alpha = \beta + 16\gamma$.

In order to see what the perspective of the scaled-Alamouti method is, a Monte Carlo simulation has been carried out. Symbols from $A_{64\text{-}QAM}$ only have been considered. 2×2 MIMO-channels have been generated at random and it is computed for each sample channel the mutual information between channel input and output for the standard-Alamouti and the scaled-Alamouti case for $s_1$ and $s_2$ that are elements of $A_{64\text{-}QAM}$. Moreover the Telatar mutual information for each sample channel has been determined. Based on these mutual informations outage capacities have been computed. From this simulation it can be concluded that for rates R<5 bit/channel use, the scaled-Alamouti method is not much worse than Telatar. Telatar assumes Gaussian input distributions and in the Alamouti cases a uniform $A_{64\text{-}QAM}$ distribution has been applied. This loss is small (roughly 0.1 bit/dimension) since the rate in bit per dimension is small (around 1 bit/dimension).

Furthermore, the rate of the scaled-Alamouti method is significantly larger than that of standard-Alamouti method (close to 1 bit/channel use for outage of 1% at 14 dB). Standard Alamouti is roughly 2 dB worse than scaled Alamouti. In order to realize a certain rate at roughly the same outage probability the standard Alamouti method needs 2 dB more signal power than scaled Alamouti, as shown in the table below:

|                | 3 bit/chan. use | 4 bit/chan. use | 5 bit/chan. use |
| --- | --- | --- | --- |
| standard Alam. | 8 dB  4%        | 11 dB  6%       | 14 dB  9%       |
| scaled Alam.   | 5 dB  10%       | 8 dB  10%       | 11 dB  9%       |

In conclusion it can be said that from the perspective of outage-capacity scaled Alamouti is to be preferred over standard Alamouti. The disadvantage of scaled Alamouti is its larger decoding complexity. This will be discussed next.

In the scaled-Alamouti case the received vector is $$\begin{pmatrix} y_{11} \\ y_{21} \\ y_{12}^* \\ y_{22}^* \end{pmatrix} = \begin{pmatrix} h_{11} & 3h_{12} \\ h_{21} & 3h_{22} \\ 3h_{12}^* & -h_{11}^* \\ 3h_{22}^* & -h_{21}^* \end{pmatrix} \begin{pmatrix} s_1 \\ s_2 \end{pmatrix} - \begin{pmatrix} 0 \\ 0 \\ h_{12}^* \\ h_{22}^* \end{pmatrix} D(3s_1) - \begin{pmatrix} h_{12} \\ h_{22} \\ 0 \\ 0 \end{pmatrix} D(s_2) + \begin{pmatrix} n_{11} \\ n_{21} \\ n_{12}^* \\ n_{22}^* \end{pmatrix}. \quad (24)$$

This can be written as $$\underline{y} = s_1 \underline{a} + s_2 \underline{b} - D(3s_1) \underline{c} - D(3s_2) \underline{d} + \underline{n},$$

with $$\underline{y} = (y_{11}, y_{21}, y^*_{12}, y^*_{22})^T,$$

$$\underline{a} = (h_{11}, h_{21}, 3h^*_{12}, 3h^*_{22})^T,$$

$$\underline{b} = (3h_{12}, 3h_{22}, -h^*_{11}, -h^*_{21})^T,$$

$$\underline{c} = (0, 0, h^*_{12}, h^*_{22})^T,$$

$$\underline{d} = (h_{12}, h_{22}, 0, 0)^T, \text{ and}$$

$$\underline{n} = (n_{11}, n_{21}, n^*_{12}, n^*_{22})^T.$$

It is important to note that, just like in the standard-Alamouti case, $$\underline{a}^\dagger \underline{b} = 0,$$

hence $\underline{a}$ and $\underline{b}$ are orthogonal.

An optimal detector determines $$\arg\min_{s_1,s_2} |\underline{y} - s_1\underline{a} - s_2\underline{b} + D(3s_1)\underline{c} + D(3s_2)|^2.$$

For message-error-rates less than 0.01, scaled Alamouti is roughly 3 dB better than standard Alamouti. For smaller message-error rates the difference becomes smaller.

Next, the decoding method is explained for the scaled Alamouti method.

The first proposed algorithm now checks all possible offset combinations $D(3s_1)$ and $D(3s_2)$. Note that both offsets can assume values $d=d'+jd''$ with $d' \in \{-16, 0, +16\}$ and $d'' \in \{-16, 0, +16\}$. This implies that 81 offset combinations are possible and have to be checked. Checking a combination requires offset correction i.e. computing $$\underline{z} = \underline{y} + D(3s_1)\underline{c} + D(3s_2)\underline{d}.$$

Then both $a^\dagger z/a^\dagger a$ and $b^\dagger z/b^\dagger b$ are sliced in a restricted way, i.e. only those $\hat{s}_1$ and $\hat{s}_2$ are considered that have the assumed $D(3\hat{s}_1)$ and $D(3\hat{s}_2)$. This results in a distance metric for all of the 81 alternatives from which the best one is chosen.

A first improvement follows from the fact that it is not needed to slice if the distance of the received vector to a signal point will be too large anyhow. A lower bound for this distance can be obtained by considering $$\underline{z}^\perp = \underline{z} - \frac{\underline{a}^\dagger \underline{z}}{\underline{a}^\dagger \underline{a}}\underline{a} - \frac{\underline{b}^\dagger \underline{z}}{\underline{b}^\dagger \underline{z}}\underline{b},$$

i.e. the part of $\underline{z}$ perpendicular to both $\underline{a}$ and $\underline{b}$. Then $$|\underline{y} - s_1\underline{a} - s_2\underline{b} + D(3s_1)\underline{c} + D(3s_2)|^2 = \qquad (25)$$
$$|\underline{z} - s_1\underline{a} - s_2\underline{b}|^2 = |\underline{z}^\perp|^2 + |\underline{z} - \underline{z}^\perp - s_1\underline{a} - s_2\underline{b}|^2 \geq |\underline{z}^\perp|^2,$$

and if $|z^\perp|^2$ is larger than (or equal to) the smallest squared distance observed for an offset-combination before, slicing is unnecessary.

Note furthermore that $$\underline{z}^\perp = \underline{y}^\perp + D(3s_1)\underline{c}^\perp + D(3s_2)\underline{d}^\perp, \qquad (26)$$

$$\underline{y}^\perp = \underline{y} - \frac{\underline{a}^\dagger \underline{y}}{\underline{a}^\dagger \underline{a}}\underline{a} - \frac{\underline{b}^\dagger \underline{y}}{\underline{b}^\dagger \underline{b}}\underline{b}, \qquad (27)$$

$$\underline{c}^\perp = \underline{c} - \frac{\underline{a}^\dagger \underline{c}}{\underline{a}^\dagger \underline{a}}\underline{a} - \frac{\underline{b}^\dagger \underline{c}}{\underline{b}^\dagger \underline{b}}\underline{b},$$

$$\underline{d}^\perp = \underline{c} - \frac{\underline{a}^\dagger \underline{d}}{\underline{a}^\dagger \underline{a}}\underline{a} - \frac{\underline{b}^\dagger \underline{d}}{\underline{b}^\dagger \underline{b}}\underline{b},$$

hence $z^\perp$ is a simple linear combination of $y^\perp$ and $c^\perp$, and $d^\perp$ and can be computed easily if $D(3s_1)$ and $D(3s_2)$ vary.

In the second method the amount of work is smaller if the first checked offset combination would already yield a small squared distance. This can be achieved by making an estimate of both $D(3s_1)$ and $D(3s_2)$ based on $\underline{y}$. Therefore consider $$\begin{pmatrix} y_{11} \\ y_{21} \end{pmatrix} = \begin{pmatrix} h_{11} & 3h_{12} \\ h_{21} & 3h_{22} \end{pmatrix}\begin{pmatrix} s_1 \\ s_2 \end{pmatrix} - \begin{pmatrix} h_{12} \\ h_{22} \end{pmatrix}D(3s_2) + \begin{pmatrix} n_{11} \\ n_{21} \end{pmatrix} \qquad (28)$$

$$= \begin{pmatrix} h_{11} \\ h_{21} \end{pmatrix}s_1 + \begin{pmatrix} h_{12} \\ h_{22} \end{pmatrix}M(3s_2) + \begin{pmatrix} n_{11} \\ n_{21} \end{pmatrix}$$

and assume that the second and third term are noise terms. Then it can be computed $$\frac{\underline{h}(1)^\dagger \underline{y}(1)}{\underline{h}(1)^\dagger \underline{h}(1)}$$

to get an estimate of $s_1$ and subsequently of $D(3s_1)$. Here $$\underline{y}(1) = (y_{22}, y_{21})^T \qquad (29)$$

$$\underline{h}(1) = (h_{11}, h_{21})^T.$$

Similarly consider $$\begin{pmatrix} y_{12}^* \\ y_{22}^* \end{pmatrix} = \begin{pmatrix} 3h_{12}^* & -h_{11}^* \\ 3h_{22}^* & -h_{21}^* \end{pmatrix}\begin{pmatrix} s_1 \\ s_2 \end{pmatrix} - \begin{pmatrix} h_{12}^* \\ h_{22}^* \end{pmatrix}D(3s_1) + \begin{pmatrix} n_{12}^* \\ n_{22}^* \end{pmatrix}$$

$$= \begin{pmatrix} -h_{11}^* \\ -h_{21}^* \end{pmatrix}s_2 + \begin{pmatrix} h_{12}^* \\ h_{22}^* \end{pmatrix}M(3s_1) + \begin{pmatrix} n_{12}^* \\ n_{22}^* \end{pmatrix}.$$

It can now be computed $$\frac{\underline{h}(2)^\dagger \underline{h}(2)}{\underline{h}(2)^\dagger \underline{h}(2)} \qquad (30)$$

to get an estimate of $s_2$ and subsequently of $D(3s_2)$. Here $$\underline{y}(2) = (y^*_{12}, y^*_{22})^T \qquad (31)$$

$$\underline{h}(2) = (-h^*_{11}, -h^*_{21})^T.$$

The initial guesses for $D(3s_1)$ and $D(3s_2)$ are now used to obtain an initial estimate of the signal pair $(s_1, s_2)$. The associated squared distance is used in the remaining part of the decoding procedure.

The Rotated and Scaled Alamouti Method

Next, the rotated and scaled Alamouti method as proposed according to a further embodiment of the present invention shall be described. Having seen above that scaled-repetition improves upon ordinary repetition in the SISO case, this concept is used to improve upon the standard Alamouti scheme for MIMO transmission. Instead of just repeating the symbols in the second transmission they are scaled. More precisely, when $s_1$ and $s_2$ are elements of $$A_{16\text{-}QAM} \triangleq \{a + jb \mid a \in A_{4\text{-}PAM}, b \in A_{4\text{-}PAM}\},$$

for some value of $\theta$ the signals $$\begin{pmatrix} x_{11} & x_{12} \\ x_{21} & x_{22} \end{pmatrix} = \begin{pmatrix} s_1 \cdot \exp(j\theta) & -s_2^* \\ M_2(s_2) & M_2(s_1^*) \end{pmatrix} \qquad (32)$$

$$= \begin{pmatrix} s_1 \cdot \exp(j\theta) & -s_2^* \\ 2s_2 & 2s_1^* \end{pmatrix} - \begin{pmatrix} 0 & 0 \\ D_2(s_2) & D_2(s_1^*) \end{pmatrix},$$

are transmitted where $M_2(\alpha) = 2\alpha - D_2(\alpha)$ with $D_2(\alpha) = 5\beta$ when $\beta$ is the complex sign of $\alpha$, defined as $\beta = \text{sign}(\text{Re}(\alpha)) + j\text{sign}(\text{Im}(\alpha))$.

Figure 5:
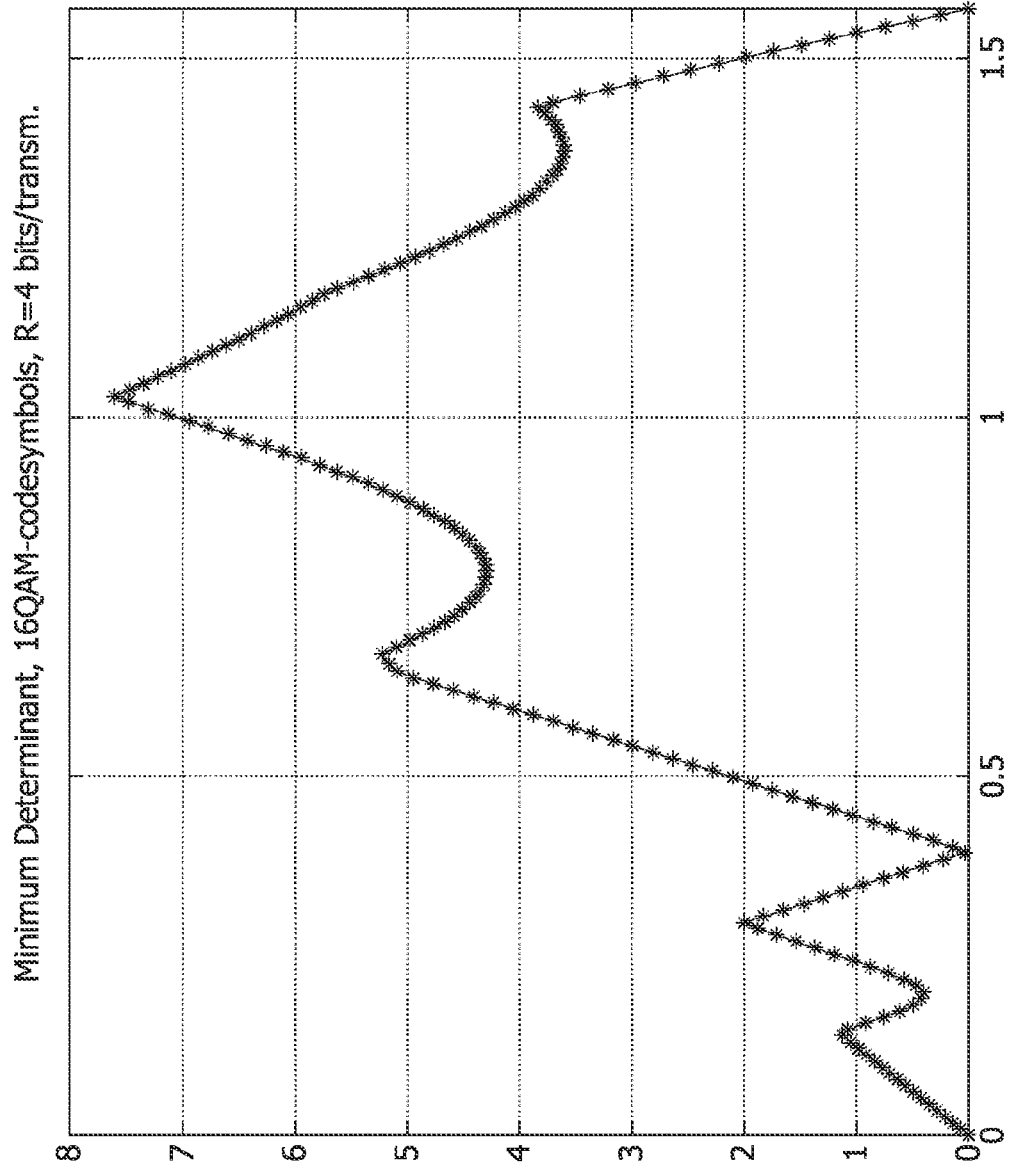
FIG. 5 shows a diagram illustrating the minimum modulus of the determinant for rotated and scaled Alamouti as a function of θ horizontally.

A first question is to determine a good value for θ. Therefore for $0 \leq \theta \leq \pi/2$ the minimum modulus of the determinant mindet (θ)

$$\text{mindet}(\theta) = \min_{(s_1, s_2), (s'_1, s'_2)} |\det(X(s_1, s_2, \theta) - X(s'_1, s'_2, \theta))|, \quad (33)$$

is determined where $$X = \begin{pmatrix} x_{11} & x_{12} \\ x_{21} & x_{22} \end{pmatrix} \quad (34)$$

is the code matrix. The minimum modulus of the determinant as a function of θ can be found in FIG. 5. The maximum value of the minimum determinant (i.e. 7.613) occurs for $$\theta_{opt} = 1.028. \quad (35)$$

This value for θ will be used in the steps explained in the following.

Next, the hard-decision performance shall be discussed. The message-error-rate for several R=4 space-time codes has been compared in FIG. 6. By message-error-rate the probability $\Pr\{\hat{X} \neq X\}$ is meant. Note that for each "test" a new message (8-bit) and a new channel matrix have been prepared. The decoder is optimal for all codes, it performs ML-decoding (exhaustive search). The methods that have been considered are:

Uncoded (B): It is transmitted $$X = \begin{pmatrix} x_{11} & x_{12} \\ x_{21} & x_{22} \end{pmatrix}, \quad (36)$$

where $x_{11}$, $x_{12}$, $x_{21}$, and $x_{22}$ are symbols from $A_{4\text{-}QAM}$.

Alamouti (C): see (17), where $s_1$ and $s_2$ are symbols from $A_{16\text{-}QAM}$.

Tilted QAM (E): Proposed by H. Yao and G. W. Wornell, "Achieving the full MIMO diversity-multiplexing frontier with rotation-based space-time codes," in Proc. Allerton Conf. Commun. Control, and Comput., Monticello, Ill., October 2003. Let $s_a$, $s_b$, $s_c$, and $s_d$ symbols from $A_{4\text{-}QAM}$. Then it is transmitted $$\begin{pmatrix} x_{11} \\ x_{22} \end{pmatrix} = \begin{pmatrix} \cos(\theta_1) & -\sin(\theta_1) \\ \sin(\theta_1) & \cos(\theta_1) \end{pmatrix} \begin{pmatrix} s_a \\ s_b \end{pmatrix}, \quad (37)$$

$$\begin{pmatrix} x_{21} \\ x_{12} \end{pmatrix} = \begin{pmatrix} \cos(\theta_2) & -\sin(\theta_2) \\ \sin(\theta_2) & \cos(\theta_2) \end{pmatrix} \begin{pmatrix} s_c \\ s_d \end{pmatrix},$$

for $$\theta_1 = \frac{1}{2}\arctan\left(\frac{1}{2}\right), \quad (38)$$

$$\theta_2 = \frac{1}{2}\arctan(2).$$

Rotated and scaled Alamouti (D): see (32) for θ=1.028, and with $s_1$ and $s_2$ from $A_{16\text{-}QAM}$.

Golden code (F): Proposed by J.-C. Belfiore, G. Rekaya, E. Viterbo, "The golden code: A 2×2 full-rate space-time code with nonvanishin determinants," IEEE Trans. Inform. Theory, vol. IT-51, No. 4, pp. 1432-1436, April 2005. Now $$X = \frac{1}{\sqrt{5}} \begin{pmatrix} \alpha(z_1 + z_2\theta) & \alpha(z_3 + z_4\theta) \\ j \cdot \overline{\alpha}(z_3 + z_4\overline{\theta}) & \overline{\alpha}(z_1 + z_2\overline{\theta}) \end{pmatrix}, \quad (39)$$

with $$\theta = \frac{1+\sqrt{5}}{2}, \quad \overline{\theta} = \frac{1+\sqrt{5}}{2},$$

$\alpha = 1+j-j\theta$, and $\overline{\alpha} = 1+j-j\overline{\theta}$ and where $z_1$, $z_2$, $z_3$, and $z_4$ are $A_{4\text{-}QAM}$-symbols.

Telatar (A): This is the probability that the Telatar capacity of the channel is smaller than 4.

Figure 6:
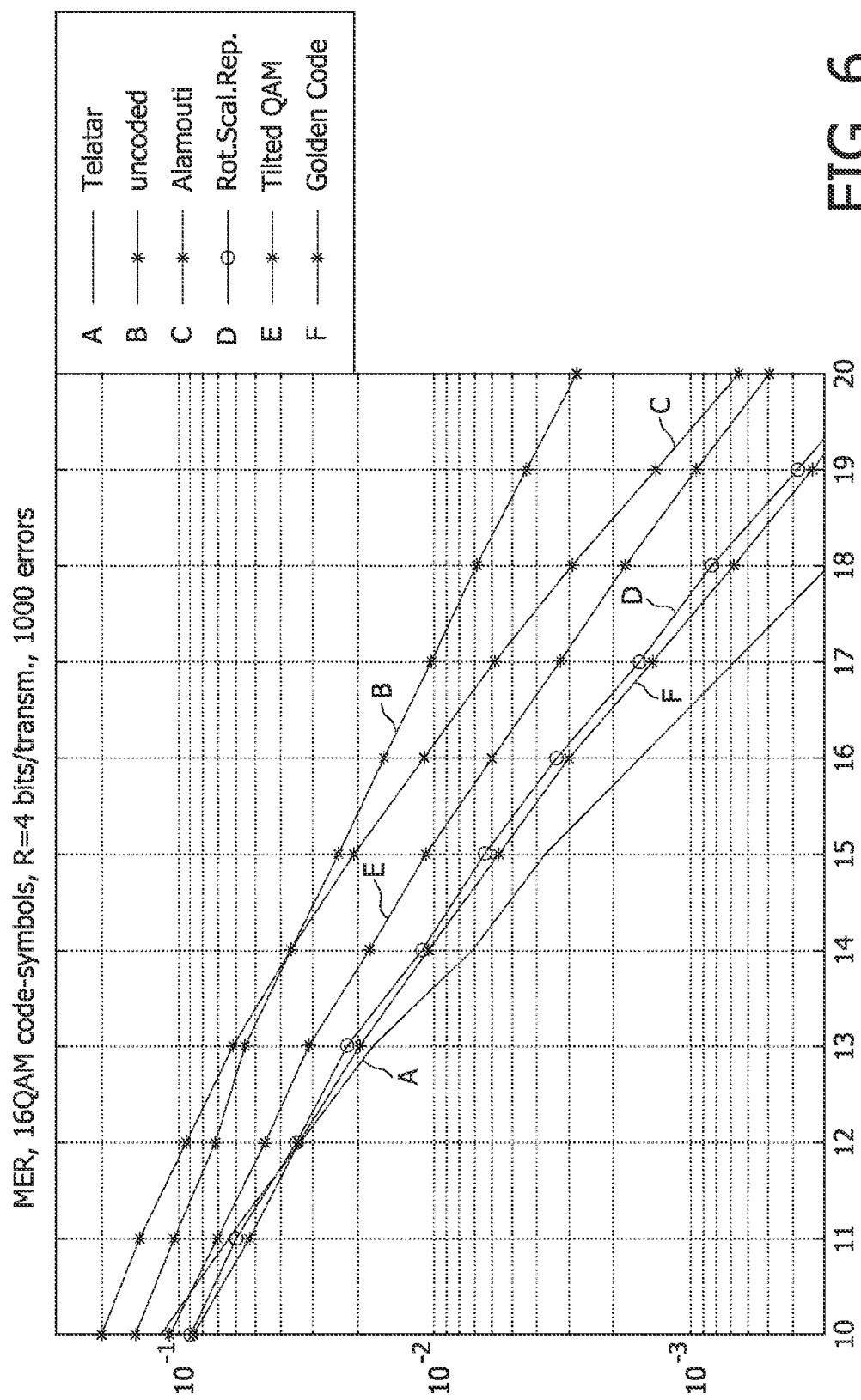
FIG. 6 shows a diagram illustrating the message error rate for several R=4 space-time codes.

Clearly it follows from FIG. 6 that the Golden code shows the best result. However rotated and scaled Alamouti is only slightly worse, roughly 0.2 dB. Important is that Alamouti coding is roughly 2 dB worse than the Golden code.

The decoding complexity shall be discussed next. Clearly the Golden code is better than rotated and scaled Alamouti. However the Golden code in principle requires the decoder to check all 256 alternative codewords. Here the complexity and performance of a suboptimal rotated and scaled Alamouti decoder will be investigated. Denote $\Theta = \exp(j\theta_{opt.})$.

In the rotated and scaled Alamouti case the received vector is $$\begin{pmatrix} y_{11} \\ y_{21} \\ y^*_{12} \\ y^*_{22} \end{pmatrix} = \begin{pmatrix} h_{11}\Theta & 2h_{12} \\ h_{21}\Theta & 2h_{22} \\ 2h^*_{12} & -h^*_{11} \\ 2h^*_{22} & -h^*_{21} \end{pmatrix} \begin{pmatrix} s_1 \\ s_2 \end{pmatrix} - \begin{pmatrix} 0 \\ 0 \\ h^*_{12} \\ h^*_{22} \end{pmatrix} D_2(s_1) - \begin{pmatrix} h_{12} \\ h_{22} \\ 0 \\ 0 \end{pmatrix} D_2(s_2) + \begin{pmatrix} n_{11} \\ n_{21} \\ n^*_{12} \\ n^*_{22} \end{pmatrix}. \quad (40)$$

This can be written as $$\underline{y} = s_1\underline{a} + s_2\underline{b} - D_2(s_1)\underline{c} - D_2(s_2)\underline{d} + \underline{n},$$

with $$\underline{y} = (y_{11}, y_{21}, y^*_{12}, y^*_{22})^T,$$

$$\underline{a} = (h_{11}\Theta, h_{21}\Theta, 2h^*_{12}, 2h^*_{22})^T,$$

$$\underline{b} = (2h_{12}, 2h_{22}, -h^*_{11}, -h^*_{21})^T,$$

$$\underline{c} = (0, 0, h^*_{12}, h^*_{22})^T,$$

$$\underline{d} = (h_{12}, h_{22}, 0, 0)^T, \text{ and}$$

$$\underline{n} = (n_{11}, n_{21}, n^*_{12}, n^*_{22})^T.$$

For the angle φ between $\underline{a}$ and $\underline{b}$ it can be written $$\cos\phi = \frac{\Re[2(\Theta-1)(h_{11}h^*_{12} + h_{21}h^*_{22})]}{|h_{11}|^2 + |h_{21}|^2 + 4|h_{12}|^2 + 4|h_{22}|^2}. \quad (41)$$

Instead of decoding $(s_1, s_2)$ it is also possible to decode $(t_1, t_2) = (M_2(s_1), M_2(s_2))$ which is equivalent to $(s_1, s_2)$. Therefore (32) is rewritten to obtain $$\begin{pmatrix} x_{11} & x_{12} \\ x_{21} & x_{22} \end{pmatrix} = \begin{pmatrix} -M_2(t_1)\Theta & M_2(t^*_2) \\ t_2 & t^*_1 \end{pmatrix} \quad (42)$$

$$= \begin{pmatrix} -2t_1\Theta & 2t^*_2 \\ t_2 & t^*_1 \end{pmatrix} - \begin{pmatrix} -D_2(t_1)\Theta & D_2(t^*_2) \\ 0 & 0 \end{pmatrix},$$

since $t = M_2(s)$ implies that $s = -M_2(t)$.

$$\begin{pmatrix} y_{11} \\ y_{21} \\ y_{12}^* \\ y_{22}^* \end{pmatrix} = \begin{pmatrix} -2h_{11}\Theta & h_{12} \\ -2h_{21}\Theta & h_{22} \\ h_{12}^* & 2h_{11}^* \\ h_{22}^* & 2h_{21}^* \end{pmatrix} \begin{pmatrix} t_1 \\ t_2 \end{pmatrix} - \quad (43)$$

$$\begin{pmatrix} -h_{11}\Theta \\ -h_{21}\Theta \\ 0 \\ 0 \end{pmatrix} D_2(t_1) - \begin{pmatrix} 0 \\ 0 \\ h_{11}^* \\ h_{21}^* \end{pmatrix} D_2(t_2) + \begin{pmatrix} n_{11} \\ n_{21} \\ n_{12}^* \\ n_{22}^* \end{pmatrix}.$$

This can be written as $$\underline{y} = t_1 \underline{a}' + t_2 \underline{b}' - D_2(t_1) \underline{c}' - D_2(t_2) \underline{d}' + \underline{n},$$

with $$\underline{a}' = (-2h_{11}\Theta, -2h_{21}\Theta, h^*_{12}, h^*_{22})^T,$$

$$\underline{b}' = (h_{12}, h_{22}, 2h^*_{11}, 2h^*_{21})^T,$$

$$\underline{c}' = (-h_{11}\Theta, -h_{21}\Theta, 0, 0)^T, \text{ and}$$

$$\underline{d}' = (0, 0, h^*_{11}, h^*_{21})^T,$$

and for the angle $\phi'$ between $\underline{a}'$ and $\underline{b}'$ the can be written as $$\cos\phi' = \frac{\Re[2(\Theta-1)(h_{11}h_{12}^* + h_{21}h_{22}^*)]}{4|h_{11}|^2 + 4|h_{21}|^2 + |h_{12}|^2 + |h_{22}|^2}. \quad (44)$$

It now follows from the inequality $2r_1 r_2 \leq r_1^2 + r_2^2$ (where $r_1$ and $r_2$ are reals), that $$\cos\phi \leq |\Theta-1| \cdot \frac{|h_{11}|^2 + |h_{12}|^2 + |h_{21}|^2 + |h_{22}|^2}{|h_{11}|^2 + |h_{21}|^2 + 4|h_{12}|^2 + 4|h_{22}|^2}, \quad (45)$$

$$\cos\phi' \leq |\Theta-1| \cdot \frac{|h_{11}|^2 + |h_{12}|^2 + |h_{21}|^2 + |h_{22}|^2}{4|h_{11}|^2 + 4|h_{21}|^2 + |h_{12}|^2 + |h_{22}|^2}.$$

If $$|h_{12}|^2 + |h_{22}|^2 \geq |h_{11}|^2 + |h_{21}|^2, \quad (46)$$

then $$\cos\phi \leq \frac{2|\Theta-1|}{5} = 0.393, \quad (47)$$

else $$\cos\phi' \leq \frac{2|\Theta-1|}{5} = 0.393. \quad (48)$$

Therefore it makes sense to decode $(s_1, s_2)$ when (46) holds and $(t_1, t_2)$ when (46) does not hold. Using zero-forcing to decode, the noise enhancement is then at most $1/(1-0.393^2) = 1.183$ which is 0.729 dB. It will be seen below that noise enhancement turns out to be un-noticeable in practise.

The decoding procedure is straightforward. Focus on the case where it is decoded $(s_1, s_2)$ for a moment. For all 16 alternatives of $((D_2(s_1), D_2(s_2))$ the vector $$\underline{z} = \underline{y} + D_2(s_1)\underline{c} + D_2(s_2)\underline{d} = s_1 \underline{a} + s_2 \underline{b} + \underline{n} \quad (49)$$

and is determined. Then the sufficient statistic $$\begin{pmatrix} \underline{a}^\dagger \underline{z} \\ \underline{b}^\dagger \underline{z} \end{pmatrix} = \begin{pmatrix} \underline{a}^\dagger \underline{a} & \underline{a}^\dagger \underline{b} \\ \underline{b}^\dagger \underline{a} & \underline{b}^\dagger \underline{b} \end{pmatrix} \begin{pmatrix} s_1 \\ s_2 \end{pmatrix} + \begin{pmatrix} \underline{a}^\dagger \underline{n} \\ \underline{b}^\dagger \underline{n} \end{pmatrix}. \quad (50)$$

Next the inverted matrix $$M = \begin{pmatrix} \underline{b}^\dagger \underline{b} & -\underline{a}^\dagger \underline{b} \\ -\underline{b}^\dagger \underline{a} & \underline{a}^\dagger \underline{a} \end{pmatrix} / D \quad (51)$$

is used where $D = (\underline{a}^\dagger \underline{a})(\underline{b}^\dagger \underline{b}) - (\underline{b}^\dagger \underline{a})(\underline{a}^\dagger \underline{b})$ to obtain $$\begin{pmatrix} \tilde{s}_1 \\ \tilde{s}_2 \end{pmatrix} = M \begin{pmatrix} \underline{a}^\dagger \underline{z} \\ \underline{b}^\dagger \underline{z} \end{pmatrix}. \quad (52)$$

Next both $\tilde{s}_1$ and $\tilde{s}_2$ are sliced under the restriction that only alternatives that match the assumed values $D_2(s_1)$ and $D_2(s_2)$ are possible outcomes. This is done for all 16 alternatives $(D_2(s_1), D_2(s_2))$. The best result in terms of Euclidean distance is now chosen.

In considering all alternatives $((D_2(s_1), D_2(s_2))$ it is only required to slice when the length of $$\underline{z} - \tilde{s}_1 \underline{a} - \tilde{s}_2 \underline{b} \quad (53)$$

is smaller than the closest distance that has been observed so far. This reduces the number of slicing steps. This approach shall be called method 1.

The number of slicing steps can even be further decreased if decoding is started with the most promising alternative $((D_2(s_1), D_2(s_2))$. This approach is called method 2. Therefore it is noted that the "direct" $s_1$-signal-component in X is $$\begin{pmatrix} s_1 \Theta & 0 \\ 0 & -s_1^*/2 \end{pmatrix}. \quad (54)$$

Therefore $(\underline{e}_1^\dagger \underline{y})/(\underline{e}_1^\dagger \underline{e}_1)$ can be sliced in order to find a good guess for $D_2(s_1)$. Similarly $(\underline{e}_2^\dagger \underline{y})/(\underline{e}_2^\dagger \underline{e}_2)$ is sliced to find a good first guess for $D_2(s_2)$. Here $$\underline{e}_1 = (h_{11}\Theta, h_{21}\Theta, -h^*_{12}/2, -h^*_{22}/2)^T, \quad (55)$$

$$\underline{e}_2 = (h_{12}/2, -h_{22}/2, -h^*_{11}, -h^*_{21})^T.$$

Then the other 15 alternatives are considered and only sliced if necessary. Note that similar methods apply if $(t_1, t_2)$ shall be decoded.

Figure 7:
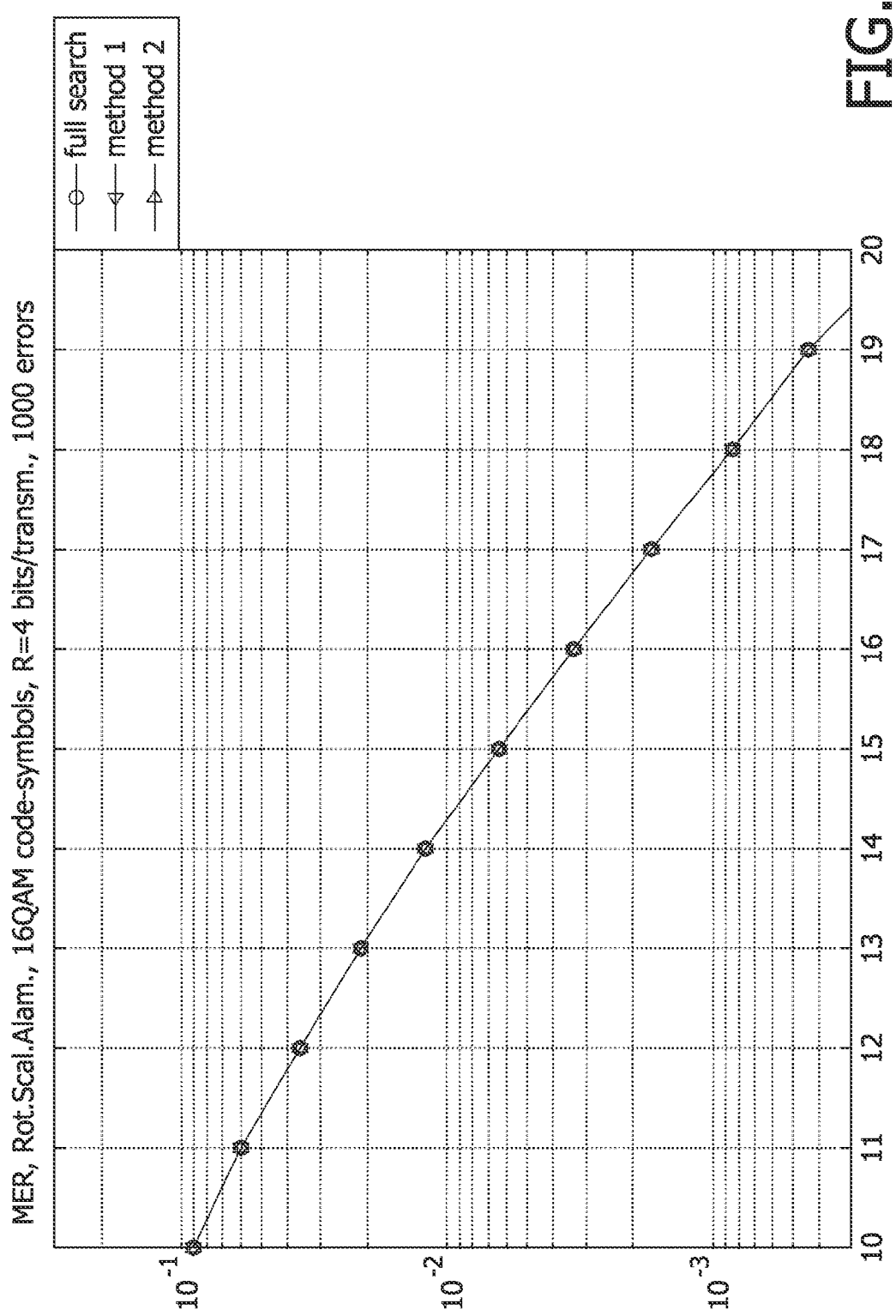
FIG. 7 shows a diagram illustrating the message error rate for three rotated scaled Alamouti decoders (R=4) (horizontally SNR)

Simulations have been carried out, first to find out what the degradation of the suboptimal decoders according to method 1 and method 2 is relative to ML-decoding. The result is shown in FIG. 7. The conclusion is that the suboptimal decoders do not demonstrate a performance degradation.

Figure 8:
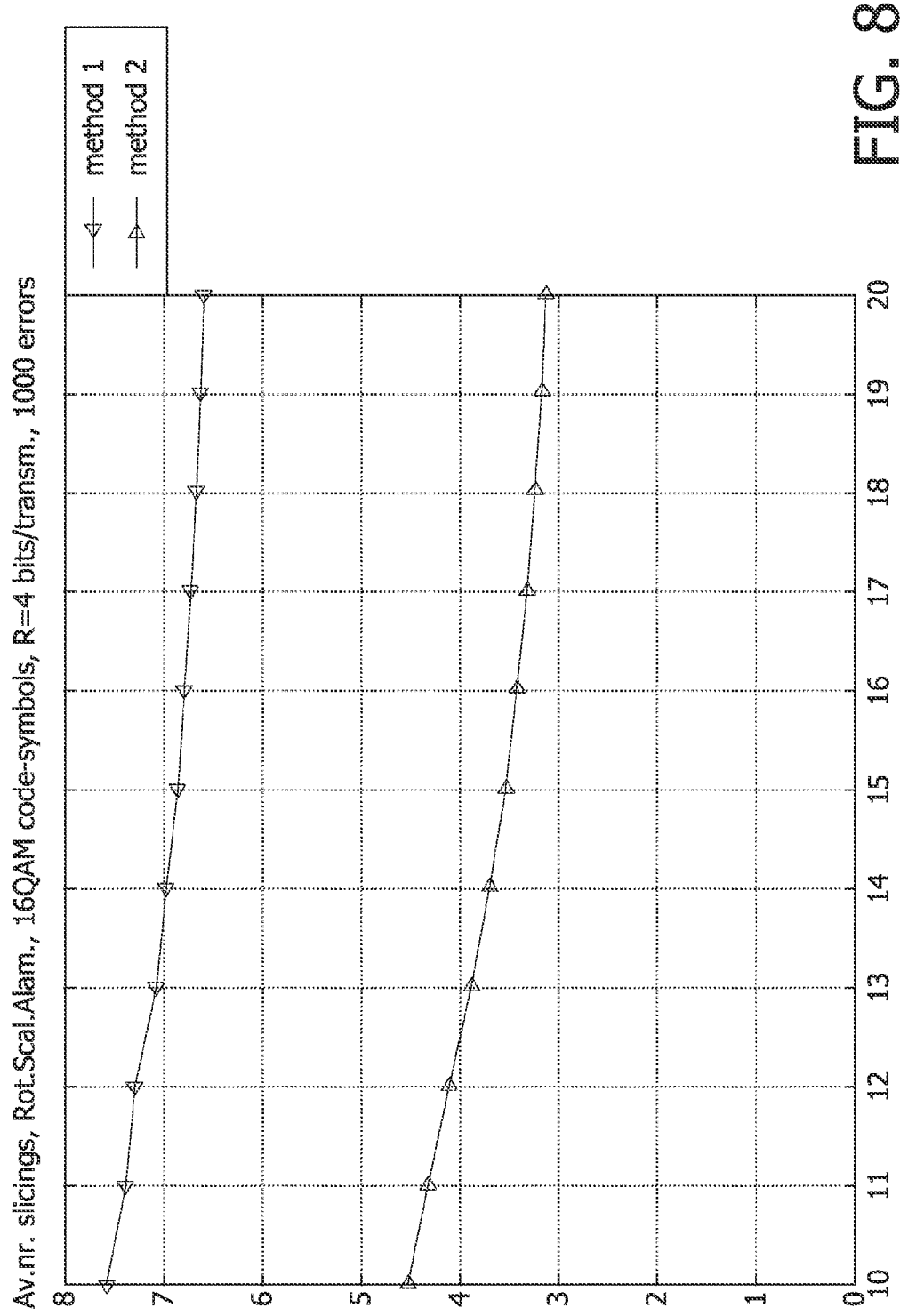
FIG. 8 shows a diagram illustrating the number of slicings for two rotated scaled Alamouti decoders (R=4) (horizontally SNR)

The average number of slicings for both method 1 and method 2 have also been considered. This is shown in FIG. 8. It can be observed that method 1 leads to roughly 7 slicings on average (as opposed to 16). Method 2 further decreases the average number of slicing to roughly 3.5.

The rotated and scaled Alamouti can also be based on 9-PAM as explained in the following. The rate of the code that was considered in the previous sections is 4 bit per channel use. To increase this rate it turns out that it is important to start from a PAM constellation with a square number of points.

Therefore the next constellation is 9-PAM. The mapping that has been considered is $M_3(\cdot)$ which is defined as updated $$M_3(x) = \begin{cases} 3x+20 & \text{for } x \in \{-8, -6, -4\} \\ 3x & \text{for } x \in \{-2, 0, +2\} \\ 3x-20 & \text{for } x \in \{+4, +6, +8\}. \end{cases} \quad (56)$$

Figure 9:
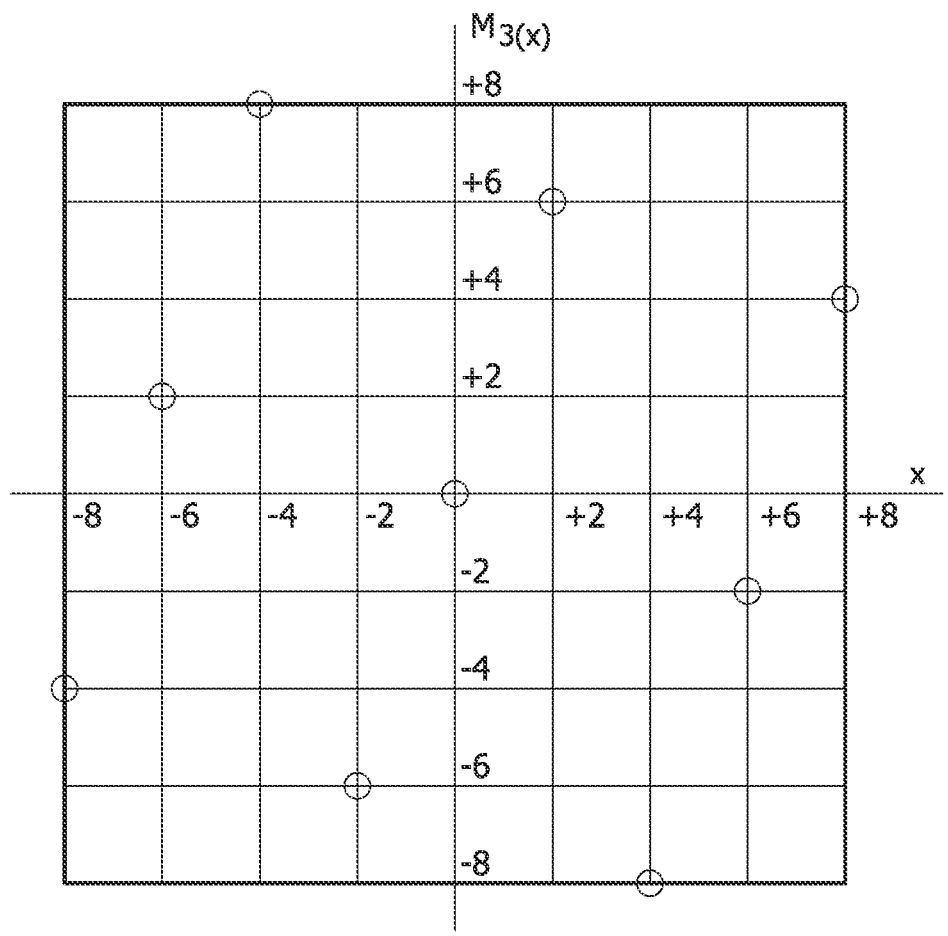
FIG. 9 illustrates a further embodiment using scaled-repetition mapping $M_3(\cdot)$.

It is important is that this mapping satisfies $M_3(M_3(x))=-x$, see FIG. 9. There are three intervals each containing three points.

More generally, $M_3(x)=3x-D_3(x)$ where it holds for the subfunction $$D_3(x) = \begin{cases} +20 & \text{for } x \in \{-8, -6, -4\} \\ 0 & \text{for } x \in \{-2, 0, +2\} \\ -20 & \text{for } x \in \{+4, +6, +8\} \end{cases}$$

in the above example.

Figure 10:
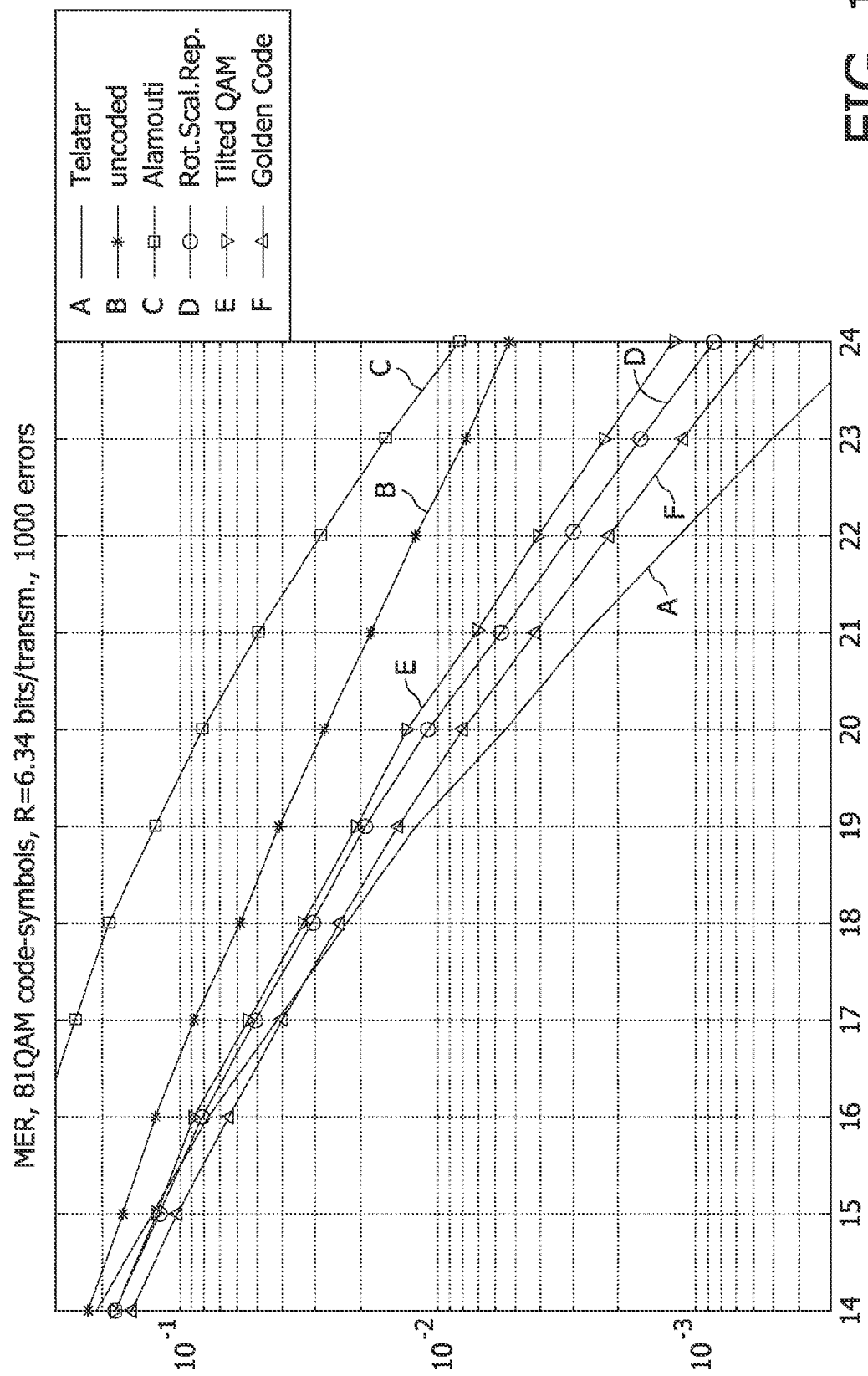
FIG. 10 shows a diagram illustrating the message error rate for several R=6.34 space-time codes (horizontally SNR in dB)

Now, a rotated and scaled Alamouti method based on this mapping and operating on symbols $s_1$ and $s_2$ from $$A_{81-QAM} \triangleq \{a+jb \mid a \in A_{9-PAM}, b \in A_{9-PAM}\}$$

can be designed. The optimal value of $\theta=1.308$. This method can now again be compared with corresponding uncoded, Alamouti, Tilted-QAM, and Golden code methods. The results are shown in FIG. 10. It is clear again that the Golden code has the best performance. Rotated and scaled Alamouti is again worse, roughly 0.5 dB, but Alamouti is roughly 4 dB worse than the Golden code.

Figure 11:
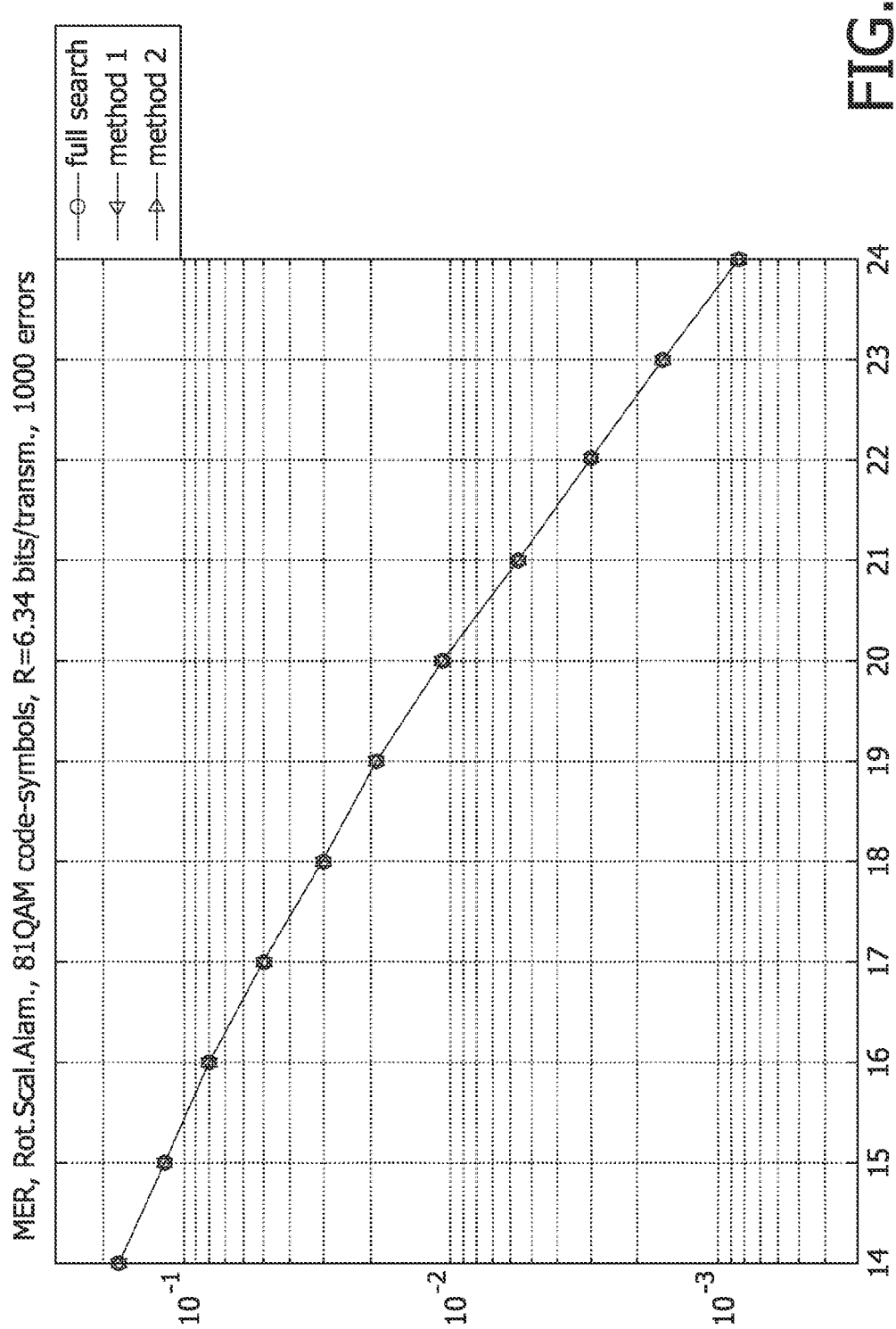
FIG. 11 shows a diagram illustrating message error rate for three rotated scaled Alamouti decoders (R=6.34) (horizontally SNR)
Figure 12:
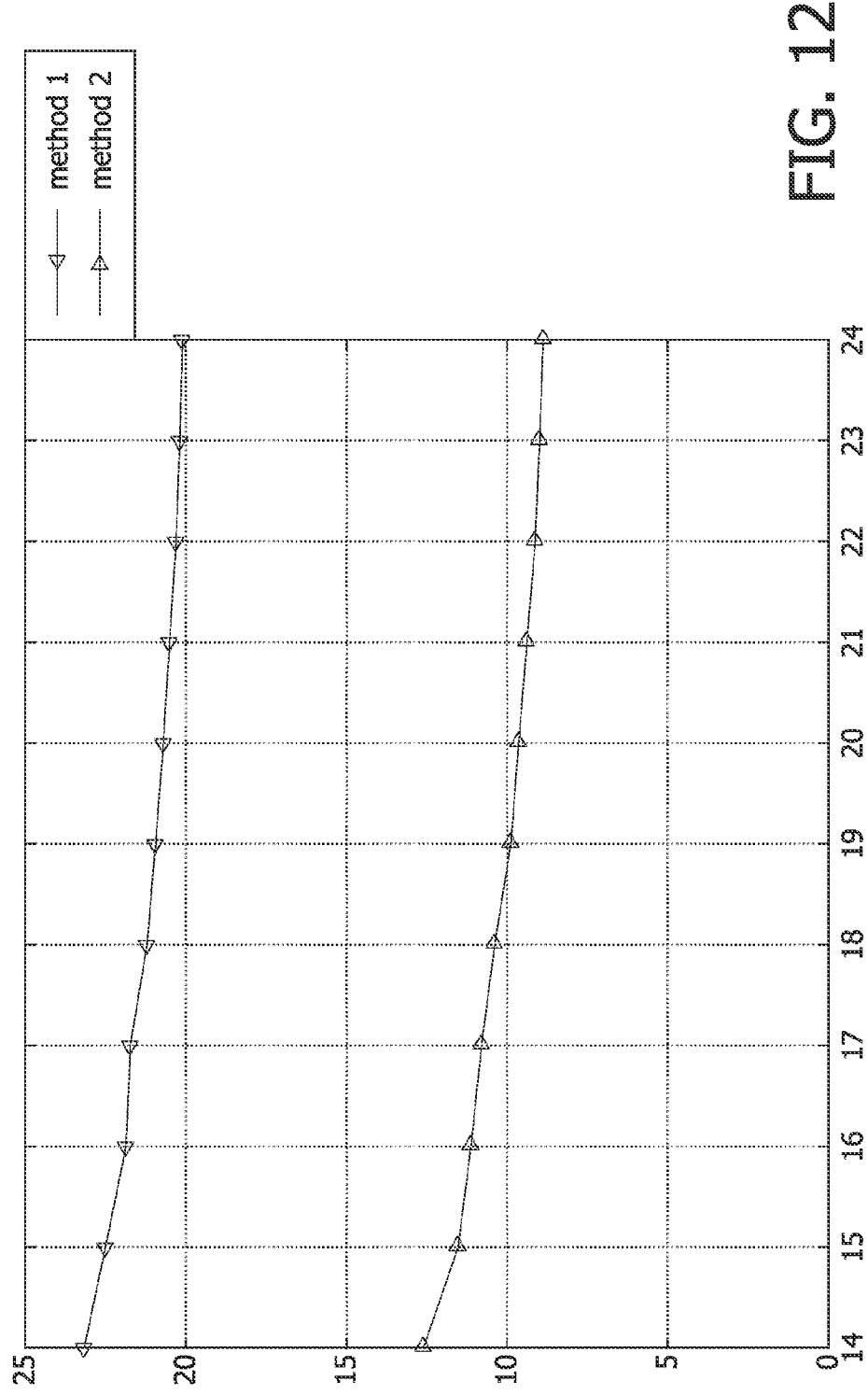
FIG. 12 shows a diagram illustrating Number of slicings for two Rotated Scaled Alamouti decoders (R=6.34) (horizontally SNR)

Again, simulations have been made to find out what the degradation of the suboptimal decoders according to method 1 and method 2 is relative to ML-decoding. The result is shown in FIG. 11. Again the conclusion is that the suboptimal decoders do not demonstrate a performance degradation. The number of slicings for both method 1 and method 2 are shown in FIG. 12. It can be observed that method 1 leads to roughly 21 slicings on average (as opposed to 81). Method 2 further decreases the average number of slicing to roughly 10. Note that exhaustive search here requires checking $81^2=6561$ codewords.

The conclusion is that the rotated and scaled Alamouti method as proposed according to the present invention has a hard-decision performance which is only slightly worse than that of the Golden code, but can be decoded with an acceptable complexity.

Figure 13:
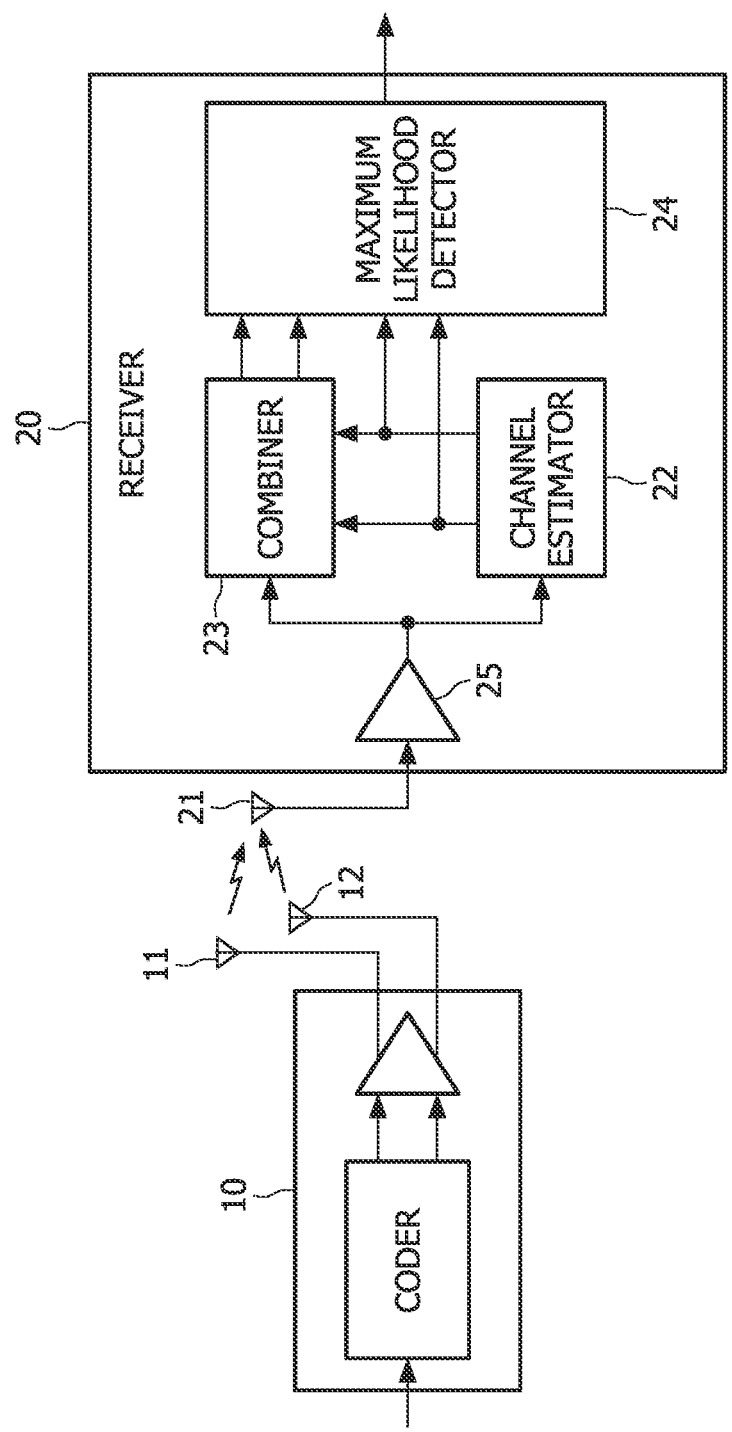
FIG. 13 shows a block diagram of an embodiment of the present invention where two transmitter antennas and one receiver antenna are employed.
Figure 14:
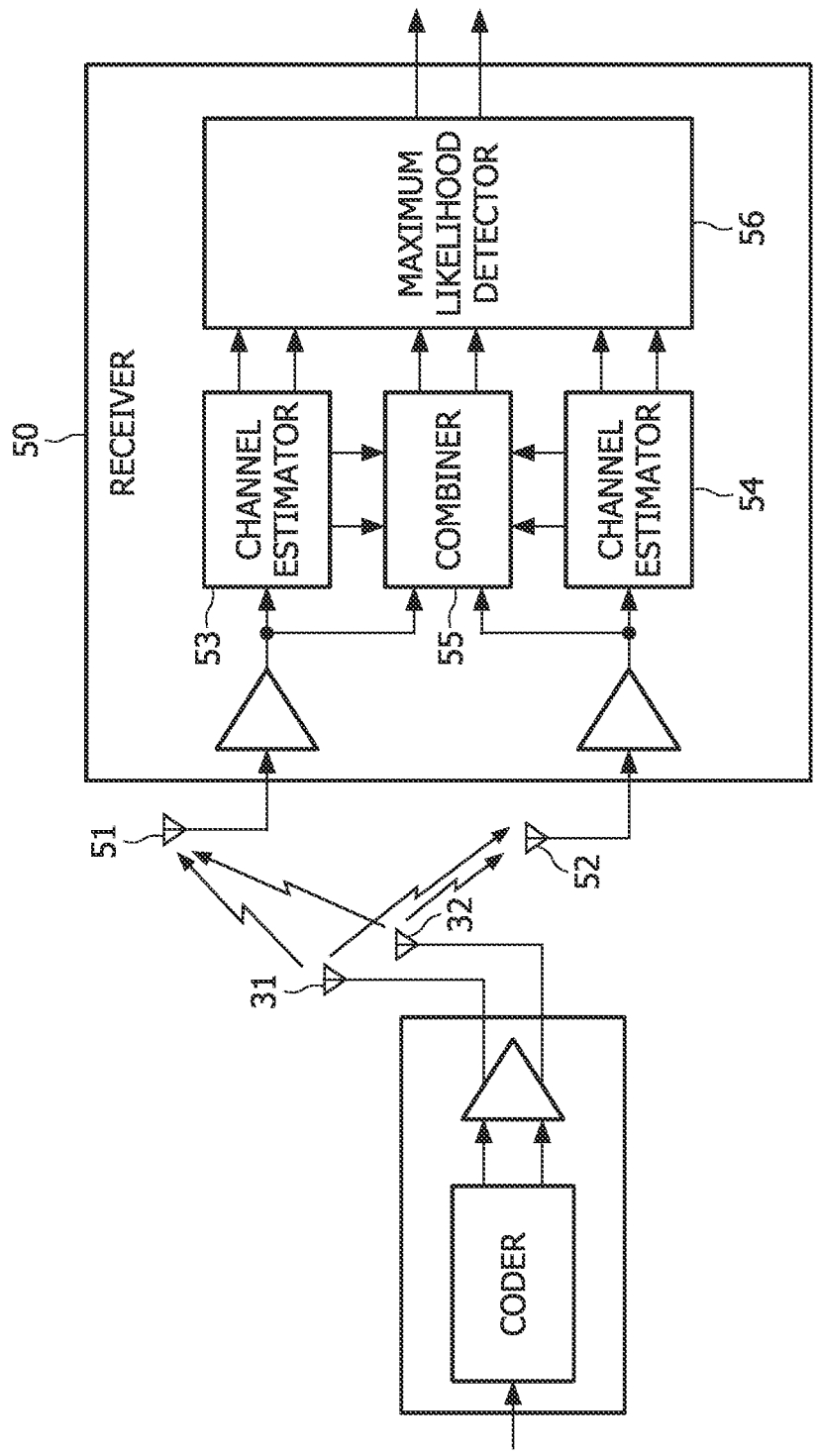
FIG. 14 shows a block diagram of an embodiment of the present invention an embodiment using two transmitter antennas and two receiver antennas are employed.

FIGS. 13 and 14 show block diagrams of two particular embodiments of transmitters and receivers according to the present invention. The general function and working of these transmitters and receivers has been described in WO 99/14871 (to which explanations reference is explicitly made here) and shall thus not be explained here in all details. These transmitters and receivers are adapted to such that the elements thereof can carry out the steps of the methods of the present invention as described above.

FIG. 13 shows a block diagram of an embodiment where two (generally k) transmitter antennas (providing space diversity) employing multiple time intervals and one receiver antenna are employed. Specifically, transmitter 10 illustratively comprises antennas 11 and 12, and it handles incoming data in blocks of 2 (generally k) symbols, where k is the number of transmitter antennas. Each block takes 2 (generally k) symbol intervals to transmit. Also illustratively, the FIG. 1 arrangement includes a receiver 20 that comprises a single antenna 21.

At any given time, a signal sent by a transmitter antenna experiences interference effects of the traversed channel, which consists of the transmit chain, the air-link, and the receive chain. The channel may be modeled by a complex multiplicative distortion factor composed of a magnitude response and a phase response. Noise from interference and other sources is added at the two received signals, i.e. the resulting baseband signal received at any time and outputted by reception and amplification section 25 includes such noise in addition to the transmitted signals.

The received signal is applied to channel estimator 22, which provides signals representing the channel characteristics or, rather, the best estimates thereof.

Those signals are applied to combiner 23 and to maximum likelihood detector 24.

The estimates developed by channel estimator 22 can be obtained by sending a known training signal that channel estimator 22 recovers, and based on the recovered signal the channel estimates are computed. This is a well known approach.

Combiner 23 receives the signal in the first time interval, buffers it, receives the signal in the next time interval, and combines the two received signals to develop estimates of the transmitted signals.

These signal estimates are sent to maximum likelihood detector 24, which develops the transmitted signals with the aid channel estimates from estimator 22.

FIG. 14 presents an embodiment where two transmit antennas 31, 32 and two receive antennas 51, 52 are used. The signal received by antenna 51 is applied to channel estimator 53 and to combiner 55, and the signal received by antenna 52 is applied to channel estimator 54 and to combiner 55. Estimates of the channel transfer functions from the transmit antennas 31, 32 to the receive antenna 51 are applied by channel estimator 53 to combiner 55 and to maximum likelihood detector 56. Similarly, estimates of the channel transfer functions from the transmit antennas 31, 32 to the receive antenna 52 are applied by channel estimator 54 to combiner 55 and to maximum likelihood detector 56. There, the transmitted signals are recovered.

The invention has been explained above with reference to embodiments referring a 2×2 MIMO system. However, in the most general sense, the idea underlying the present invention refers to the building of a block code mapping a k-symbol vector into an n-symbol vector, in which the n symbols are scaled (and, more preferably, rotated) versions of the k symbols or of the complex conjugate of the k symbols with at least one scaling function being piece-wise linear with at least two pieces.

The code is then built for a MIMO system with k transmit antennas. Hence, the "pairs" as, for instance, mentioned in the claims, might as well be triplets or tuples with an appropriately adapted mapping, and the invention could be applied in any MIMO system. For instance, three complex symbols (a triplet) could be mapped onto 2, 3, or more symbol-triplet using scaling (and rotation). Further, the embodiment of the invention about scaled repetition is preferably used in ARQ SISO systems, in which the re-transmission is a scaled version of the original transmitted symbol.

Still further, instead of one MIMO transmitter, also a distributed transmitter could use the present invention of a rotated and scaled Alamouti method. It is then necessary that the parts of the distributed transmitter could code a message using rotated and scaled Alamouti. The virtual (or distributed) transmitter occurs e.g. in relay communication. The real transmitter sends a message to two relays, these two relays then act as one distributed transmitter. In other words, the encoding and transmission could be done at different locations. So instead of one transmitter with two antennas, there could be two (cooperating) transmitters each having one antenna.

Different from the above examples, the scaling function and/or the rotation function could be applied to different symbols than the symbols for which they are applied in these examples. The scaling function and/or the rotation function could be, for instance, be applied to all symbols. According to the invention the mapping should be such that it is piecewise linear. The scaling function scales the incoming signal with a constant that is typically 2, 3, 4, etc. but also complex scaling factor are possible e.g. 2+j.

Further, also a single receive antenna could be used according to the present invention.

As explained above the decoding method is different from the Alamouti decoder/receiver. According to the Alamouti method the received signals are orthogonal so the symbol estimates with no noise enhancement can be separated and the optimum decoding (ML) is very simple to implement. In the scaled-repeated code this is not the case and the optimum decoding is more complex. However, given the properties of the chosen scaling function, according to the present invention a simple sub-optimum decoding method was derived which basically performs as good as the optimum decoding.

In a general sense, the decoding has to match the encoding. So, if the code is changed, also the decoding will change accordingly. However, as far as the condition on the scaling $M(M(x))=-x$ is satisfied, the decoding has similar possible sub-optimum and simple structure.

Briefly summarized the decoding according to the present invention consists generally of the following steps:

1) Check (46) and decide to decode $(s_1,s_2)$ or its scaled version $(t_1,t_2)$.

2) For each alternative of $((D_2(s_1),D_2(s_2))$ (This checking for couples comes from the piece-wise linear with at least two pieces. There are 16 possible couples for $((D_2(s_1),D_2(s_2))$ since $D_2(\,)$ returns the complex sign of its argument which can have the following four values (+1+j, +1−j, −1−j, −1+j). For $D_3(\,)$, instead of the sign function 3 regions are defined for the real dimension and 3 regions for the imaginary dimension (see 56)). Therefore 3*3x3*3=81 possible couples are obtained.):

2a) Use equations (49)-(52) to derive an estimate $(\tilde{s}_1, \tilde{s}_2)$ of the couple $(s_1,s_2)$. (The vectors c,d and c',d' remain the same independently of the constellation size. The vector a,b and a',b' changes a bit. Using $M_2$, they have the factor 2 in some of the elements. Using $M_3$, they have the factor 3 instead of the factor 2.)

2b) Calculate and save the Euclidean distance between the received vector z and the estimate $(\tilde{s}_1 a + \tilde{s}_2 b)$ (see (53))

2c) Slice the estimate of $(s_1,s_2)$ and save the sliced results

3) The final estimate of $(s_1,s_2)$ is the sliced result corresponding to the minimum Euclidean distance.

In Method 1 and Method 2, the step 2c) is performed only if the current Euclidean distance is the smallest one encountered so far.

Method 2 further reduces the number of slicing steps, by starting the investigation of pairs $((D_2(s_1),D_2(s_2))$ from y a good guess of $((D_2(s_1),D_2(s_2))$ obtained by projecting the received vector z of equation (49) onto the space defined by $e_1$ and $e_2$ of (55). (Also $e_1$ and $e_2$ change depending on the scaling function. With $M_2$, they are defined in (55). With $M_3$, the ½ factor in $e_1$ and $e_2$ changes in a ⅓ factor.)

The slicer depends on the constellation size as it does in a regular communication system. A 4QAM and a 16-QAM have different slicer.

In a another embodiment of the invention, it has been noticed that current systems use M-QAM constellations that take integer values and are not designed for diversity transmission.

They are designed to increase the minimum Euclidian distance (main factor that determined the SER), but the minimum product distance is not considered. According to this other embodiment, new constellations are proposed. These constellations do not need to take integer values, and should consider the minimum product distance as the design criteria. Consider also the min Euclidian distance for the worst-case scenarios where the channels are the same. The Euclidian distance criteria imples a Repetition structure (Co—Re) that should look like QAM-like constellation in diversity branch dimensions. Any rotated version of conventional M-QAM constellations in 2 branch dimensions achieves the same Euclidian distance.

The optimum rotation in branch dimensions should maximize the minimum product distance. The requirement is n bits/real dimension. A conventional constellation is $2^{(2n)}$-QAM/complex dimension.

According to this new constellation it is proposed the following:

Step 1: Start with $2^n$-QAM constellation in diversity branch dimensions (x=transmitted value in branch 1, y=transmitted value in branch 2, $z=x+j*y \in 2^n$ QAM);

Step 2: Rotate $2^n$ QAM with $\theta=\frac{1}{2}*\tan^{-1}(2)$ and $z \in 2^n$ QAM, thus x=Real(z*exp(j θ)), y=Imag(z*exp(j θ)), x or y set will form the new PAM constellation/real dimension (T) and x and y will form the mapping structure of Co—Re scheme for each real dimension.

Step 3: Form the complex constellation by using two PAM obtained by T for each dimension:

s1∈New constellation: Cnew={s1=x1+j*x2|x1, x2∈T} for the first transmission.

s2∈New constellation: Cnew={s2=y1+j*y2|y1, y2∈T} for the first transmission.

In an example of this embodiment, the optimum rotation angle that maximizes the minimum product distance is θ=½*tan-1(2). Thus, these new constellation design for 2 branch diversity systems enable an improved minimum product distance, leading to a lower SER with Co—Re. Morover, this improvement is higher in higher constellation sizes. This is applicable to any 2-branch diversity scheme, e.g., WLAN, cellular, broadcast or sensor networks, and for instance for channel estimation in (wireless) systems. The tx signal includes some known pilot sequences so that the rx can estimate how the signal has been corrupted by the channel. DVB-T also performs a channel estimation but in presence of a SFN and using OFDM modulation. SFN makes the channel very long. OFDM allows for the insertion of pilots in the time-frequency grid.

This embodiment has several advantages as: a good minimum product distance, a good symbol-error-rate performance, is easily scalable to higher constellations sizes, starts with conventional QAM constellations, and rotates with the optimum angle. However, the new constellations are not on the grid, and it is hard to get the exact values. Thus, it Requires more memory for each constellation point and makes the slicing operation more complex. In a variant of this embodiment, different constellations are proposed. The constellations points are on the grid, i.e., take integer values as conventional QAM, and may be non-uniformly distributed, i.e., not all points in the constellation are equidistant to each other. According to a method pursuant to this variant, first step is considering all possible integer values for each constellation size. Then, normalizing the average power and comparing the constellations in terms of minimum product distance. For instance, a 4-PAM constellation design (Ordinary 4-PAM dproduct=64, optimum 4-PAM dproduct=80.17)

Options: a) [−2 −1 1 2]→[−2 −1 1 2] *squareroot(10)/squareroot(5)→dproduct=36.

b) [−4 −1 1 4]→[−4 −1 1 4] *squareroot(10)/squareroot(17)→dproduct=77.85 c) [−5 −1 1 5]→[−5 −1 1 5] *squareroot(10)/squareroot(26)→dproduct=59.17 d) [−5 −2 2 5]→[−5 −2 2 5] *squareroot(10)/squareroot(29)→dproduct=52.44 ... [−4 −1 1 4] 4-PAM constellation seems to be a good choice that has a high minimum product distance and it is on the grid. Complex constellations can be devised by using the new PAM constellations in both real and imaginary axes. 4-PAM→new 16 QAM complex constellation. For larger constellation sizes:

Option 1: Same approach can be applied, i.e., search every possibility considering the minimum product distance as the criteria Option 2: Use the basic structure of one of the new 4-PAM constellations and repeat it. Option 2 seems to be more practical For instance, designing new 16-PAM (256 QAM) constellations by replicating the [−4 −1 1 4] structure to obtain a new 16-PAM. These constellations on the grid for 2 branch diversity systems enables good minimum product distance→Low MER with Co—Re. The improvement is higher in higher constellation sizes, still on the grid, i.e., take integer values which requires less memory in the receiver. This improvement is applicable to any 2-branch diversity scheme, e.g., WLAN, cellular, broadcast or sensor networks, STBCs, Space-time Trellis Codes, OTD.

In another embodiment of the invention, it is proposed a new Space time block coding (STBC) for 2 transmit antenna systems using the concepts of scaled repetition and rotation but without any conjugation of the symbols as in Alamouti coding. Especially in high constellation sizes, the new STBC structure provides better symbol-error-rate performance than STBCs and achieves the same minimum determinant as the Golden Codes and a similar SER performance. RSA is based on scaled repetition in Alamouti coding. Alamouti coding provides a simplified receiver structure for ordinary repetition. Better performance-complexity trade-offs can be achieved if we do not restrict to Alamouti structure.

Min determinant criteria (c and c' are any possible pair of STBC codes)

$$Pr\{\underline{c} \to \underline{c}'\} \approx \gamma' \frac{1}{\det^2((\underline{c}' - \underline{c})(\underline{c}' - \underline{c})\dagger)} \frac{1}{SNR^4}.$$

Min determinant is highly dependent on the minimum product distance of the constellation-rearrangement scheme, thus, use scaled repetition scheme with the constellations defined in the previous embodiment. New scheme may help to increase the minimum determinant by modifying the existing STBC structure.

Since the product distance of the streams are affected by the new STBC structure, the optimum rotation angle that maximizes the minimum determinant has changed.

Optimum rotation is $\theta = \pi/2$ for all constellation sizes. Same minimum determinant as the Golden code for all constellation sizes. Min absolute value of determinant is 8.9443 for 16 QAM. The min determinant of Golden Code with this rate is also 8.9443.

For R=6.34 bits/transm. constellation size

Increased min determinant→Similar MER with the Golden Code

Much better performance than the other competitors, e.g., Alamouti, uncoded, tilted QAM or RSA. A new STBC structure for 2 transmit antenna systems This structure permits a higher min determinant, a more efficient space-time block codes, a better SER performance than RSA coding, with a better utilization of scaled repetition approach in designing STBCs. A similar SER performance with the Golden Codes.

In accordance with another variant of the invention, a new space-time block coding structure, Rotated and Scaled Alamouti coding (RSA), is proposed for two transmit antenna systems. It is shown that the new STBC outperforms the well-known Alamouti coding, and provides a robust transmission scheme without requiring a very complex receiver structure. It is also mentioned that there exist some other competitor space-time block codes, i.e., Golden codes, that also outperform the Alamouti coding. The proposed RSA coding performs slightly worse than the Golden code. However, it enjoys a simpler decoding mechanism than the Golden code which uses exhaustive ML search for decoding. This variant aims to improve the performance of the RSA coding by providing a new repetition structure utilizing the new constellations and constellation re-arrangement scheme designed for 2-branch diversity systems proposed previously. By applying an appropriate rotation, the new repetition structure provides the RSA coding a better symbol-error-rate performance than the current repetition structure and reduces the performance gap between RSA coding and Golden code. For certain constellation sizes it completely eliminates the performance gap. The RSA coding still enjoys the simple receiver structure according to the invention.

Scaled repetition scheme is based on conventional Co—Re schemes. In the previous variants of the invention, we showed that the performance of conventional Co—Re schemes can be improved by using new constellations and new Co—Re structures. These new constellations and Co—Re structures can be used to increase the min determinant criteria that determines the symbol error rate of the STBC: Min determinant criteria (c and c' are any possible pair of STBC codes).

$$Pr\{\underline{c} \to \underline{c}'\} \approx \gamma' \frac{1}{\det^2((\underline{c}' - \underline{c})(\underline{c}' - \underline{c})\dagger)} \frac{1}{SNR^4}.$$

Min determinant is highly dependent on the minimum product distance of the constellation-rearrangement scheme (scaled repetition scheme in RSA)

For RSA, $$\det(\underline{c}' - \underline{c}) = e^{j\theta} \underbrace{(s_1' - s_1)((M_2(s_1'^*) - M_2(s_1^*)))}_{\text{product distance}} + \underbrace{(s_2'^* - s_2^*)((M_2(s_2') - M_2(s_2)))}_{\text{product distance}}$$

New constellations and constellation re-arrangement scheme may help to increase the minimum determinant by modifying the existing scaled repetition scheme. New scaled repetition scheme for RSA coding using new constellations and constellation re-arrangement.

It changes only the repetition structure, not the scaling concept. The optimum rotation angle that maximizes the minimum product distance is found as $\delta = \frac{1}{2}*\tan^{-1}(2)$. Scaling factor=$\tan(\delta)=(1-\text{root}5)/2$. This scaling factor is fixed for all constellation sizes.

Since the product distance of the streams are affected by the new scaled repetition scheme, the optimum rotation angle that maximizes the minimum determinant has changed.

Optimum rotation is $\theta = \tan^{-1}(2)$ for 16-QAM (4-PAM for each real dimension).

Min absolute value of determinant is 8.9443>7.613

The min determinant of Golden Code with this rate is also 8.9443.

For R=4 bits/transmitter constellation size. An increased min determinant leads to similar SER with the Golden Code. It still enjoys the simple receiver mechanism and much better performance than the other competitors e.g., Alamouti, uncoded, tilted QAM.

For higher constellation sizes, the performance gap between Golden Code and RSA will be reduced by using the new repetition structure while RSA will still enjoy the simpler decoding structure.

Recently, Golden Code is proposed for two transmit antenna systems. It is shown that this new space-time block code outperforms the well-known Alamouti coding, and provides a robust transmission scheme. However, it requires a very complex receiver structure, i.e., exhaustive ML search. This variant of the invention proposes a suboptimum low complexity receiver structure for decoding the Golden Code by using the same approach used in detecting the RSA coding according to the invention. Especially in high constellation sizes, the new receiver structure provides a substantial reduction in the computational complexity while providing an acceptable level of symbol-error-rate close to the ML detection.

$$\begin{pmatrix} x_{11} & x_{12} \\ x_{21} & x_{22} \end{pmatrix} = \frac{1}{\sqrt{5}} \begin{pmatrix} \alpha(a+\theta b) & \alpha(c+\theta d) \\ j\bar{\alpha}(c+\bar{\theta}d) & \bar{\alpha}(a+\bar{\theta}b) \end{pmatrix} \quad \text{Golden Code Structure [1]}$$

Where, $-a, b, c$ and $d$ are $M - QAM$ symbols $-\bar{\theta} = 1 - \theta = \dfrac{1-\sqrt{5}}{2}$, $\alpha = 1 + j(1-\theta)$ and $\bar{\alpha} = 1 + j(1-\bar{\theta})$ Golden Code can be viewed as space-time coding scheme based on scaled repetition Scaled repetition provides two different interpretations of the transmitted signal Different interpretation means different spatial signatures Choose the best interpretation (set of spatial signatures) to apply zero-forcing (ZF) receivers: the lowest noise enhancement with ZF receivers and check the Euclidian distance for each sub-region.

Interpretation of the Golden Code:

$$\frac{1}{\sqrt{5}}\begin{pmatrix} x_{11} & x_{12} \\ x_{21} & x_{22} \end{pmatrix} = \frac{1}{\sqrt{5}} \begin{pmatrix} \alpha(a+\theta b) & \alpha(c+\theta d) \\ j\bar{\alpha}(c+\bar{\theta}d) & \bar{\alpha}(a+\bar{\theta}b) \end{pmatrix}$$

For a given $a = a_j$, $x_{11} = \alpha\theta b + \alpha a_j, \quad x_{22} = \bar{\alpha} a_j + \overline{a\theta b}$ $\Rightarrow x_{22} = \bar{\alpha} a_j + \overline{a\theta}\left[\dfrac{x_{11} - \alpha a_j}{\alpha\theta}\right] = \underbrace{\dfrac{\overline{\alpha\theta}}{\alpha\theta}}_{\beta_1:\text{Scaling Factor}} x_{11} + \underbrace{\bar{\alpha}\left(1 - \dfrac{\bar{\theta}}{\theta}\right)a_j}_{D_1(a_j);\text{Offset}}$ Similarly, for a given $b = b_i$, $x_{11} = \alpha\theta b_i + \alpha a, \quad x_{22} = \bar{\alpha} a + \overline{a\theta} b_i$ $\Rightarrow x_{11} = \alpha\theta b_i + \alpha\left[\dfrac{x_{22} - \overline{\alpha\theta} b_i}{\bar{\alpha}}\right] = \underbrace{\dfrac{\alpha}{\bar{\alpha}}}_{\beta_2:\text{Scaling Factor}} x_{22} + \underbrace{\alpha(\theta - \bar{\theta})b_i}_{D_2(b_i);\text{Offset}}$ There are four different Interpretation of the Golden Code:

$$\begin{pmatrix} x_{11} & x_{12} \\ x_{21} & x_{22} \end{pmatrix} = \begin{pmatrix} \alpha(a+\theta b) & \alpha(c+\theta d) \\ j\bar{\alpha}(c+\bar{\theta}d) & \bar{\alpha}(a+\bar{\theta}b) \end{pmatrix}$$

$$= \begin{pmatrix} x_{11} & x_{21} \\ j\beta_1 x_{21} & \beta_1 x_{11} \end{pmatrix} + \begin{pmatrix} 0 & 0 \\ jD_1(c) & D_1(a) \end{pmatrix} \quad (1)$$

$$= \begin{pmatrix} \beta_2 x_{22} & x_{21} \\ j\beta_1 x_{21} & x_{22} \end{pmatrix} + \begin{pmatrix} D_2(b) & 0 \\ jD_1(c) & 0 \end{pmatrix} \quad (2)$$

$$= \begin{pmatrix} x_{11} & -j\beta_2 x_{12} \\ x_{12} & \beta_1 x_{11} \end{pmatrix} + \begin{pmatrix} 0 & D_2(d) \\ 0 & D_1(a) \end{pmatrix} \quad (3)$$

$$= \begin{pmatrix} \beta_2 x_{22} & -j\beta_2 x_{12} \\ x_{12} & x_{22} \end{pmatrix} + \begin{pmatrix} D_2(b) & D_2(d) \\ 0 & 0 \end{pmatrix} \quad (4)$$

Leading to 4 Different Spatial Signature Sets

The received signal in a 2×2 MIMO system is $$r_1 = \frac{1}{\sqrt{5}}\begin{pmatrix} h_{11} & h_{21} \\ h_{12} & h_{22} \end{pmatrix}\begin{pmatrix} x_{11} \\ x_{21} \end{pmatrix} + \begin{pmatrix} n_{11} \\ n_{12} \end{pmatrix},$$

in the first time slot $$r_2 = \frac{1}{\sqrt{5}}\begin{pmatrix} h_{11} & h_{21} \\ h_{12} & h_{22} \end{pmatrix}\begin{pmatrix} x_{12} \\ x_{22} \end{pmatrix} + \begin{pmatrix} n_{21} \\ n_{22} \end{pmatrix},$$

in the second time slot

Thus, $$\begin{pmatrix} r_1 \\ r_2 \end{pmatrix} = \frac{1}{\sqrt{5}}\begin{pmatrix} h_{11} & h_{21} \\ h_{12} & h_{22} \\ \beta_1 h_{21} & j\beta_1 h_{11} \\ \beta_1 h_{22} & j\beta_1 h_{12} \end{pmatrix}\begin{pmatrix} x_{11} \\ x_{12} \end{pmatrix} + M(a, c) + \begin{pmatrix} n_1 \\ n_2 \end{pmatrix}$$

$$= \frac{1}{\sqrt{5}}\begin{pmatrix} \beta_2 h_{11} & h_{21} \\ \beta_2 h_{12} & h_{22} \\ h_{21} & j\beta_1 h_{11} \\ h_{22} & j\beta_1 h_{12} \end{pmatrix}\begin{pmatrix} x_{22} \\ x_{12} \end{pmatrix} + M(b, c) + \begin{pmatrix} n_1 \\ n_2 \end{pmatrix}$$

$$= \frac{1}{\sqrt{5}}\begin{pmatrix} h_{11} & -j\beta_2 h_{21} \\ h_{12} & -j\beta_2 h_{22} \\ \beta_1 h_{21} & h_{11} \\ \beta_1 h_{22} & h_{12} \end{pmatrix}\begin{pmatrix} x_{11} \\ x_{12} \end{pmatrix} + M(a, d) + \begin{pmatrix} n_1 \\ n_2 \end{pmatrix}$$

$$= \frac{1}{\sqrt{5}}\begin{pmatrix} \beta_2 h_{11} & -j\beta_2 h_{21} \\ \beta_2 h_{12} & -j\beta_2 h_{22} \\ h_{21} & h_{11} \\ h_{22} & h_{12} \end{pmatrix}\begin{pmatrix} x_{21} \\ x_{22} \end{pmatrix} + M(b, d) + \begin{pmatrix} n_1 \\ n_2 \end{pmatrix}$$

It is thus proposed a suboptimum Receiver Structure:
  Golden Code can be interpreted in 4 different ways
  4 Different Spatial Signature Sets
  The simplest form of receiver is zero-forcing (ZF)
  Apply the ZF receiver to the best interpretation
  Search for lowest noise enhancement
  % of the signal power lost due to ZF receiver $$P_{loss,i} = \frac{|s_{1(i)}^H s_{2(i)}|}{|s_{1(i)}||s_{2(i)}|} \text{ where } S_i = [s_{1(i)} s_{2(i)}]$$

According to a method pursuant to this example, a first step is finding the Si that minimizes the loss, then applying the ZF receiver of Si and checking all possible offset values, i.e., M.

The following table is given here for comparison of the complexity of these systems.

| Modulation | Optimum Detection | Proposed Detection | ZF Receiver |
| --- | --- | --- | --- |
| BPSK | 16 exhaustive search (Euclidian distance computation) | 8 Slicing | 4 Slicing |
| QPSK | 256 exhaustive search (Euclidian distance computation) | 32 Slicing | 4 Slicing |
| 16QAM | 65536 exhaustive search (Euclidian distance computation) | 512 Slicing | 4 Slicing |

A low complexity Golden Code Decoder is proposed based on different interpretations of the Golden Code. The receiver is simpler than ML detection but more complex than ZF receiver. Thus, is a good trade-off between complexity and SER performance.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An encoder for encoding incoming symbols of an incoming data stream into channel symbols of a channel data stream for transmission over a transmission channel comprising:
    a computer operating as:
        a mapping means for block by block mapping incoming symbols onto pairs of channel symbols, a block comprising two incoming symbols, the mapping means being arranged for:
            mapping the block onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and
        an output means for outputting said channel symbols.

2. The encoder as claimed in claim 1, wherein said mapping means are adapted for applying a rotation function for rotating at least one of said two incoming symbols and/or of the complex conjugate of at least one of said two incoming symbols by a rotation angle such that said two pairs of channel symbols include a rotated version of at least one of said two incoming symbols or of the complex conjugate of at least one of said two incoming symbols, wherein said rotation angle is different from 0 and 180 degrees.

3. The encoder as claimed in claim 2, wherein said mapping means are adapted for applying a rotation function for rotating at least one of said two incoming symbols by a predetermined rotation angle, said rotation angle being chosen to maximize the minimum modulus of the determinant of the code matrices.

4. The encoder as claimed in claim 2, wherein said mapping means are adapted for applying a rotation function for rotating at least one of said two incoming symbols by a fixed predetermined rotation angle.

5. The encoder as claimed in claim 2, wherein said mapping means are adapted for applying a rotation function for rotating the first of said two incoming symbols by a rotation angle such that said first pair of channel symbols includes said rotated version of said first incoming signal.

6. The encoder as claimed in claim 2, wherein said mapping means are adapted for block by block mapping two incoming symbols onto two pairs of channel symbols such that
    said first pair of channel symbols includes a rotated version of one of the two incoming signals and a scaled version of the other incoming signal and
    said second pair of channel symbols includes a scaled version of said one of the two incoming signals and a negated and complex conjugate version of said other incoming signal.

7. A transmitter for transmitting channel symbols of a channel data stream over a transmission channel comprising:
    an encoder for encoding incoming symbols of an incoming data stream into channel symbols of said channel data stream, said encoder comprising:
        a computer operating as a mapping means for block by block mapping incoming symbols onto pairs of channel symbols, a block comprising two incoming symbols, the mapping means being arranged for mapping the block onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and transmission means for receiving said channel symbols from said encoder and for transmitting said channel symbols over said transmission channel.

8. An encoding method for encoding incoming symbols of an incoming data stream into channel symbols of a channel data stream for transmission over a transmission channel comprising the steps of:

block by block mapping incoming symbols onto pairs of channel symbols, a block comprising two incoming symbols and being mapped onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and outputting said channel symbols.

9. A decoder being adapted for block by block decoding received channel symbols of a channel data stream that has been encoded by an encoder comprising:

a computer operating as a mapping means mapping means for block by block mapping incoming symbols onto pairs of channel symbols, a block comprising two incoming symbols, the mapping means being arranged for mapping the block onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and transmitted over a transmission channel.

10. The decoder as claimed in claim 9, comprising a computer:

selecting a pair of possible function values of incoming symbols s for decoding a current block of received channel symbols comprises a pair of received channel symbols y and, determining first intermediate scaled versions $D_2(s)$ of said selected incoming symbols s by applying a sub-function $D_2$ and for subtracting terms including said first intermediate scaled versions $D_2(s)$ of said selected incoming symbols from said pair of received channel symbols y to obtain second intermediate versions z of said selected incoming symbols s, detecting third intermediate versions s of said selected incoming symbols s by applying a zero force detection, calculating the Euclidian distance between the received signal and the estimated symbols, slicing said estimate, third intermediate versions $\tilde{s}$ of said selected incoming symbols s to obtain estimates of said selected incoming symbols s, repeating said steps with other pairs of possible incoming symbols s until a predetermined stop condition is met or until a minimum Euclidian distance is found; and outputting said pair of possible incoming symbols s resulting in the minimum Euclidian distance.

11. A decoding method being adapted for block by block decoding received channel symbols of a channel data stream, which have been encoded from incoming symbols by an encoder comprising:

a computer operating as a mapping means mapping means for block by block mapping incoming symbols onto pairs of channel symbols, a block comprising two incoming symbols, the mapping means being arranged for mapping the block onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and transmitted over a transmission channel.

12. A receiver for receiving channel symbols of a channel data stream over a transmission channel comprising:

receiving means, in particular one or two receiving antennas, for receiving said channel data stream over said transmission channel and for outputting the channel symbols said channel data signal to a decoder, and a decoder for block by block decoding the received channel symbols of said channel data stream, wherein said channel data stream having been encoded by an encoder comprising:

a computer operating as a mapping means mapping means for block by block mapping incoming symbols onto pairs of channel symbols, a block comprising two incoming symbols, the mapping means being arranged for mapping the block onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols, and transmitted over a transmission channel.

13. A method operable in an encoder for generating an encoded data signal for transmission over a transmission channel carrying channel symbols of a channel data stream, said method causing said encoder to:

receive incoming symbols of an incoming data stream; and encode said received incoming symbol, said encoding comprising:

block by block mapping said received incoming symbols onto pairs of channel symbols, a block comprising two incoming symbols and being mapped onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by piece-wise linear function with at least two pieces, said scaling factor being selected dependent upon said incoming symbols.

14. A computer program product comprising program code means stored on a non-transitory medium, said program code causing a computer to perform the steps of:

blockby block mapping incoming symbols onto pairs of channel symbols, a block comprising two incoming symbols and being mapped onto two pairs of channel symbols such that said two pairs of channel symbols include scaled versions of said two incoming symbols and/or of the complex conjugate of at least one of said two incoming symbols, said scaled versions being obtained by applying a scaling function having a scaling factor with an absolute value different from one and being represented by a piece-wise linear function with at least two pieces, said scaling factor being selected dependent upon said incoming symbols.

* * * * *